United States Patent
Maeda

(10) Patent No.: US 10,774,229 B2
(45) Date of Patent: Sep. 15, 2020

(54) AQUEOUS INK

(71) Applicant: KAO CORPORATION, Tokyo (JP)

(72) Inventor: Takahiro Maeda, Odawara (JP)

(73) Assignee: KAO CORPORATION, Tokyo (JP)

(*) Notice: Subject to any disclaimer, the term of this patent is extended or adjusted under 35 U.S.C. 154(b) by 0 days.

(21) Appl. No.: 16/310,702

(22) PCT Filed: Jun. 16, 2017

(86) PCT No.: PCT/JP2017/022375
§ 371 (c)(1),
(2) Date: Dec. 17, 2018

(87) PCT Pub. No.: WO2017/217544
PCT Pub. Date: Dec. 21, 2017

(65) Prior Publication Data
US 2019/0270898 A1 Sep. 5, 2019

(30) Foreign Application Priority Data

Jun. 17, 2016 (JP) .................................. 2016-121164

(51) Int. Cl.
C09D 11/033 (2014.01)
C09D 11/104 (2014.01)
C09D 11/322 (2014.01)
B05D 1/26 (2006.01)
B41J 2/01 (2006.01)
C08G 63/195 (2006.01)
C09C 3/10 (2006.01)
C09D 11/54 (2014.01)
B41M 5/00 (2006.01)

(52) U.S. Cl.
CPC .............. C09D 11/322 (2013.01); B41J 2/01 (2013.01); B41M 5/00 (2013.01); C08G 63/195 (2013.01); C09C 3/10 (2013.01); C09D 11/54 (2013.01)

(58) Field of Classification Search
CPC ........................... C09D 11/104; C09D 11/322
See application file for complete search history.

(56) References Cited

U.S. PATENT DOCUMENTS 4,082,778 A 4/1978 Jost et al.
2015/0337149 A1* 11/2015 Wakabayashi ....... C09D 11/322
347/20

FOREIGN PATENT DOCUMENTS

| JP | 8-253720 A | 10/1996 |
| JP | 8-259871 A | 10/1996 |
| JP | 8-269310 A | 10/1996 |
| JP | 2004-10658 A | 1/2004 |
| JP | 2014-5448 A | 1/2014 |
| JP | 2014-28114 A | 2/2015 |

OTHER PUBLICATIONS

Machine-generated English-language translation of JP 8-269310 A.*
Machine-generated English-language translation of JP 8-253720 A.*
Machine-generated English-language translation of JP 2015-028114 A.*
International Search Report, issued in PCT/JP2017/022375, PCT/ISA/210, dated Aug. 15, 2017.
Extended European Search Report, dated Feb. 3, 2020, for European Application No. 17813437.5.

* cited by examiner

Primary Examiner — Vu A Nguyen
(74) Attorney, Agent, or Firm — Birch, Stewart, Kolasch & Birch, LLP

(57) ABSTRACT

The present invention relates to a water-based ink that contains pigment-containing polyester-based resin particles A, pigment-free polyester-based resin particles B, an organic solvent and water, in which a content of an organic solvent C having a boiling point of not higher than 235° C. in a whole amount of the organic solvent is not less than 90% by mass. The water-based ink of the present invention can be improved in rub fastness, solvent resistance and adhesion to a non-water absorbing printing medium with good balance therebetween, even when printed on the non-water absorbing printing medium.

19 Claims, No Drawings

AQUEOUS INK

FIELD OF THE INVENTION

The present invention relates to a water-based ink and an ink-jet printing method.

BACKGROUND OF THE INVENTION

In ink-jet printing methods, droplets of ink are directly ejected onto a printing medium from very fine nozzles and allowed to adhere to the printing medium to form characters or images thereon. The ink-jet printing methods have become rapidly spread because of various advantages such as easiness of full coloration, low cost, capability of using a plain paper as the printing medium, non-contact with printed characters or images, etc.

In recent years, in order to impart good weathering resistance and good water resistance to printed materials, an ink containing a pigment as a colorant has been extensively used. In addition, from the standpoint of improving ejection stability and storage stability of ink, in order to stably compounding a pigment in a water-based ink, the technologies for enclosing the pigment in a polymer using a dispersant capable of modifying a surface of the pigment, etc., have been developed.

On the other hand, it has been required to print characters or images not only on a high-water absorbing printing medium such as those printing media conventionally called a plain paper and a copying paper, etc., but also on a printing medium for commercial printing purposes such as a low-water absorbing coated paper such as an offset coated paper or a non-water absorbing resin film such as a polyvinyl chloride resin film, a polypropylene resin film and a polyester resin film.

It is known that when characters or images are printed on the low-water absorbing or non-water absorbing printing medium by the ink-jet printing methods, there tend to occur problems such as prolonged drying time of the printed characters or images owing to slow absorption or no absorption of liquid components of the ink into the printing medium, and deterioration in rub fastness thereof in an initial stage of the printing.

Hitherto, when printing characters or images on the low-water absorbing or non-water absorbing printing medium, a solvent-based pigment ink using an organic solvent as a dispersing medium and a UV-curing ink have been mainly employed. This is because when using the aforementioned inks, there occurs such a phenomenon that the organic solvent is penetrated into the low-water absorbing or non-water absorbing printing medium and causes swelling of the surface of the printing medium to thereby fix the pigment in the printing medium, or a firm resin coating is formed on the printing medium after printing, so that it is possible to improve anti-bleeding properties and rub fastness of these inks.

However, these conventional inks tend to have such an inexpedience that a large amount of the organic solvent is diffused into air upon drying to cause adverse influence on environments, or a radical initiator or a monomer used in the UV-curing ink raises a risk concerning safety. For this reason, at the present time, development of water-based pigment inks having a less burden on working environments and natural environments has proceeded.

On the other hand, in the water-based pigment inks, it has been still required to improve their adhesion to a low-water absorbing printing medium or a non-water absorbing printing medium.

JP 2015-28114A (Patent Literature 1) discloses a water-based ink for ink-jet printing which is excellent in ejection properties, and capable of forming printed characters or images that are excellent in fixing properties onto a printing medium and obtaining printed materials having excellent gloss, and contains pigment particles and polyester resin particles, in which the pigment particles are constituted of a pigment and a polyester resin.

JP 2014-5448A (Patent Literature 2) discloses a two-component aqueous ink set for ink-jet printing which is free of disturbance of printed characters or images such as bleeding and intercolor bleeding, and excellent in rub fastness immediately after printing, and includes a first ink that contains a coloring material, a hydroxy group- and/or carboxy group-containing resin, and a water-soluble solvent and/or water, and a second ink that contains a vinylamine-based polymer, and a water-soluble solvent and/or water.

SUMMARY OF THE INVENTION

The present invention relates to a water-based ink that contains pigment-containing polyester-based resin particles A, pigment-free polyester-based resin particles B, an organic solvent and water, in which a content of an organic solvent C having a boiling point of not higher than 235° C. in a whole amount of the organic solvent is not less than 90% by mass.

DETAILED DESCRIPTION OF THE INVENTION

For example, in the fields of foods and medical treatment, an alcohol has been used for disinfection or sterilization in some cases. On a resin film of a container, etc., used in these fields, not only package designs, but also product information such as statements of efficacy, usage, best-before date, lot number, etc., have been usually printed. These printed materials have been required to have good resistance to an alcohol.

Even when characters or images are printed on a printing medium using the inks described in the Patent Literatures 1 and 2, it has also been required to further improve their resistance to a solvent such as an alcohol, etc.

The present invention relates to a water-based ink that can be improved in rub fastness, solvent resistance and adhesion to a non-water absorbing printing medium with good balance therebetween even when printed on the non-water absorbing printing medium, and an ink-jet printing method using the water-based ink.

Meanwhile, the term "non-water absorbing" as used in the present specification is a concept that is intended to include both of low-water absorbing properties and non-water absorbing properties, and it means that a water absorption of the printing medium per unit surface area thereof is not less than 0 g/m² and not more than 2.5 g/m² as measured under such a condition that a contact time between the printing medium and pure water is 100 milliseconds.

That is, the present invention relates to the following aspects [1] to [3].

[1] A water-based ink containing pigment-containing polyester-based resin particles A, pigment-free polyester-based resin particles B, an organic solvent and water, in which a content of an organic solvent C having a boiling point of not higher than 235° C. in a whole amount of the organic solvent is not less than 90% by mass.

[2] A use of the water-based ink according to the aforementioned aspect [1] for printing characters or images on a printing medium by an ink-jetting method, in which a water absorption of the printing medium per unit surface area thereof is not less than 0 g/m$^2$ and not more than 2.5 g/m$^2$ as measured in a pure water contact time of 100 milliseconds.

[3] An ink-jet printing method including the step of printing characters or images on a printing medium using the water-based ink according to the aforementioned aspect [1], in which a water absorption of the printing medium per unit surface area thereof is not less than 0 g/m$^2$ and not more than 2.5 g/m$^2$ as measured in a pure water contact time of 100 milliseconds.

According to the present invention, there are provided a water-based ink that can be improved in rub fastness, solvent resistance and adhesion to a non-water absorbing printing medium with good balance therebetween even when printed on the non-water absorbing printing medium, and an ink-jet printing method using the water-based ink.

[Water-Based Ink]

The water-based ink of the present invention (hereinafter also referred to merely as an "ink") contains pigment-containing polyester-based resin particles A, pigment-free polyester-based resin particles B, an organic solvent and water, in which a content of an organic solvent C having a boiling point of not higher than 235° C. in a whole amount of the organic solvent is not less than 90% by mass.

In accordance with the present invention, the printed characters or images obtained by drying the water-based ink on the non-water absorbing printing medium can be improved in rub fastness, solvent resistance to an alcohol, etc., and adhesion to the non-water absorbing printing medium (hereinafter also referred to merely as "substrate-adhesion properties") with good balance therebetween. The reason why the aforementioned advantageous effects can be attained by the present invention is considered as follows, though it is not necessarily clearly determined yet.

In the water-based ink according to the present invention, it is considered that by using a polyester as a resin species constituting the pigment-containing polyester-based resin particles A, it is possible to enhance affinity between the printed characters or images obtained by drying the water-based ink and the non-water absorbing printing medium, so that the printed characters or images can exhibit high substrate-adhesion properties. In addition, it is considered that since the polyester is hardly swelled with alcohols such as ethanol and isopropyl alcohol, the resulting printed characters or images can exhibit excellent solvent resistance to the alcohols, etc. Furthermore, by using the polyester contained in the pigment-free polyester-based resin particles B as a fixing resin in combination with the aforementioned polyester, the pigment-containing polyester-based resin particles A and the pigment-free polyester-based resin particles B are compatibilized with each other on the printing medium, so that it is possible to form the printed characters or images in which the polyesters contained in the pigment-containing polyester-based resin particles A and the pigment-free polyester-based resin particles B as the fixing resin are uniformly dispersed on the printed surface of the printing medium. As a result, it is considered that since the pigment is coated and hidden with the polyesters contained in the pigment-containing polyester-based resin particles A and the pigment-free polyester-based resin particles B, the resulting printed characters or images can be improved in rub fastness, substrate-adhesion properties and solvent resistance with good balance therebetween.

Moreover, since the content of the organic solvent C having a boiling point of not higher than 235° C. in a whole amount of the organic solvent used in the water-based ink of the present invention is not less than 90% by mass, it is possible not only to soften the resins contained in the respective resin particles, but also to uniformly disperse these resins in the ink upon forming a film of the ink. For this reason, the resins can be improved in film-forming properties, so that it is possible to obtain a uniform film of the ink which is excellent in solvent resistance and substrate-adhesion properties. In addition, it is considered that since the ink after forming the printed characters or images can be enhanced in drying properties, it is possible to reduce an amount of the organic solvent remaining between the pigment-containing polyester-based resin particles A and the pigment-free polyester-based resin particles B, or between the printing medium and the printed characters or images formed by the pigment-containing polyester-based resin particles A and the pigment-free polyester-based resin particles B, so that the uniform printed characters or images can be formed on the printing medium. Thus, it is considered that as a result of forming a uniform film of the ink owing to the use of the organic solvent and reducing an amount of the organic solvent remaining in the film of the ink obtained after drying, it is possible to more effectively exhibit the respective properties of the aforementioned pigment-containing polyester-based resin particles A and pigment-free polyester-based resin particles B. On the other hand, it is considered that when using an organic solvent having a boiling point of higher than 235° C., there is such a large tendency that the organic solvent remains in the film of the ink obtained after drying.

In consequence, it is considered that the water-based ink according to the present invention can be more effectively improved in the aforementioned rub fastness, substrate-adhesion properties and solvent resistance with good balance therebetween by the synergistic effect obtained by compounding all of the aforementioned pigment-containing polyester-based resin particles A and pigment-free polyester-based resin particles B as well as the aforementioned specific organic solvent in the water-based ink.

<Pigment-Containing Polyester-Based Resin Particles A>

The pigment-containing polyester-based resin particles A contain a polyester PA.

The average particle size of the pigment-containing polyester-based resin particles A that are contained in the water-based ink of the present invention is preferably not less than 40 nm, more preferably not less than 50 nm and even more preferably not less than 60 nm, and is also preferably not more than 200 nm, more preferably not more than 190 nm and even more preferably not more than 180 nm, from the viewpoint of enhancing optical density of the resulting water-based ink upon printing.

The average particle size of the pigment-containing polyester-based resin particles A may be measured by the method described in Examples below.

In addition, from the viewpoint of improving substrate-adhesion properties and ejection properties of the resulting ink, the content of the polyester PA in the resin contained in the pigment-containing polyester-based resin particles A is preferably not less than 80% by mass and more preferably not less than 90% by mass, and is also preferably not more than 100% by mass. The content of the polyester PA in the resin contained in the pigment-containing polyester-based resin particles A is furthermore preferably 100% by mass.

Also, from the same viewpoint as described above, the content of the polyester PA in the water-based ink is preferably not less than 1% by mass and more preferably not less than 2% by mass, and is also preferably not more than 20% by mass, more preferably not more than 10% by mass and even more preferably not more than 5% by mass.

(Polyester PA)

The polyester PA may be produced by subjecting at least an alcohol component and a carboxylic acid component to polycondensation.

[Alcohol Component]

The alcohol component as a raw material monomer from which a constitutional unit of the polyester PA is derived (hereinafter also referred to merely as a "raw material monomer of the polyester PA") preferably includes an aromatic diol from the viewpoint of improving pigment-dispersing properties, solvent resistance and substrate-adhesion properties of the resulting ink.

The aromatic diol is preferably an alkyleneoxide adduct of bisphenol A.

Meanwhile, the alkyleneoxide adduct of bisphenol A as used in the present invention means a whole structure of a compound formed by adding an oxyalkylene group to 2,2-bis(4-hydroxyphenyl)propane.

Specific examples of the preferred alkyleneoxide adduct of bisphenol A include those compounds represented by the following general formula (I).

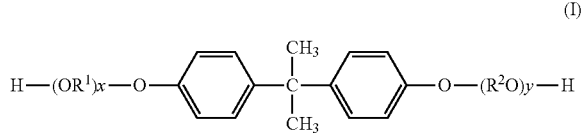

(I)

In the general formula (I), $OR^1$ and $R^2O$ are respectively an oxyalkylene group, and are each independently preferably an oxyalkylene group having not less than 1 and not more than 4 carbon atoms and more preferably an oxyethylene group or an oxypropylene group.

The suffixes x and y each correspond to a molar number of addition of the alkyleneoxide, and are each independently preferably not less than 1 and more preferably not less than 2, and are also each independently preferably not more than 16, more preferably not more than 7, even more preferably not more than 5 and further even more preferably not more than 3. In addition, from the viewpoint of attaining good reactivity with the carboxylic acid component, an average value of a sum of x and y is preferably not less than 2. From the same viewpoint as described above, the average value of a sum of x and y is also preferably not more than 7, more preferably not more than 5 and even more preferably not more than 3.

Furthermore, the $OR^1$ groups in the number of x and the $R^2O$ groups in the number of y may be respectively the same or different from each other. From the viewpoints of improving substrate-adhesion properties of the resulting ink, the $R^1O$ groups and the $R^2O$ groups are respectively preferably identical to each other. These alkyleneoxide adducts of bisphenol A may be used alone or in combination of any two or more thereof. Examples of the preferred alkyleneoxide adducts of bisphenol A include propyleneoxide adducts of bisphenol A and ethyleneoxide adducts of bisphenol A. Among these alkyleneoxide adducts of bisphenol A, more preferred are propyleneoxide adducts of bisphenol A.

The content of the alkyleneoxide adduct of bisphenol A in the alcohol component as the raw material monomer of the polyester PA is preferably not less than 50 mol %, more preferably not less than 60 mol % and even more preferably not less than 70 mol %, and is also preferably not more than 100 mol %, from the viewpoint of improving pigment-dispersing properties, solvent resistance and substrate-adhesion properties of the resulting water-based ink.

The alcohol component as the raw material monomer of the polyester PA may also contain the following alcohol compounds in addition to the alkyleneoxide adduct of bisphenol A.

Examples of the alcohol compounds as the raw material monomer of the polyester PA include ethylene glycol, propylene glycol (identical to "1,2-propanediol"), glycerin, pentaerythritol, trimethylolpropane, hydrogenated bisphenol A, sorbitol and alkylene (having not less than 2 and not more than 4 carbon atoms) oxide adducts of these compounds (average molar number of addition of the alkyleneoxide: not less than 1 and not more than 16).

These compounds as the alcohol component may be used alone or in combination of any two or more thereof.

[Carboxylic Acid Component]

The raw material monomer of the polyester PA also includes the carboxylic acid component in addition to the aforementioned alcohol component.

Examples of the carboxylic acid component include carboxylic acids as well as anhydrides and alkyl (having not less than 1 and not more than 3 carbon atoms) esters of these carboxylic acids, etc.

Specific examples of the preferred carboxylic acid component include aromatic dicarboxylic acids, aliphatic dicarboxylic acids, alicyclic dicarboxylic acids and trivalent or higher-valent polycarboxylic acids. Among these carboxylic acids, from the viewpoint of improving reactivity of the carboxylic acid component with the alcohol component as well as from the viewpoint of improving substrate-adhesion properties and ejection properties of the resulting ink, more preferred are aromatic dicarboxylic acids and aliphatic dicarboxylic acids, and even more preferred are aliphatic dicarboxylic acids.

Examples of the preferred aromatic dicarboxylic acids include phthalic acid, isophthalic acid and terephthalic acid. Of these aromatic dicarboxylic acids, more preferred is terephthalic acid.

Examples of the aliphatic dicarboxylic acids include unsaturated aliphatic dicarboxylic acids and saturated aliphatic dicarboxylic acids. Of these aliphatic dicarboxylic acids, from the viewpoint of improving reactivity of the carboxylic acid component with the alcohol component as well as from the viewpoint of improving substrate-adhesion properties and ejection properties of the resulting ink, preferred are unsaturated aliphatic dicarboxylic acids.

From the same viewpoint as described above, as the unsaturated aliphatic dicarboxylic acids, preferred are fumaric acid and maleic acid, and more preferred is fumaric acid.

Examples of the preferred saturated aliphatic dicarboxylic acids include adipic acid and succinic acid that may be substituted with an alkyl group an/or an alkenyl group.

Examples of the preferred alicyclic dicarboxylic acids include cyclohexanedicarboxylic acid, decalinedicarboxylic acid and tetrahydrophthalic acid.

Examples of the preferred trivalent or higher-valent polycarboxylic acids include trimellitic acid and pyromellitic acid.

These compounds as the carboxylic acid component may be used alone or in combination of any two or more thereof.

[Method for Producing Polyester PA]

The polyester PA may be produced by subjecting at least the alcohol component and the carboxylic acid component to polycondensation reaction. The suitable configurations and contents of the alcohol component and carboxylic acid component are the same as those described previously.

For example, the polyester PA may be produced by subjecting the aforementioned alcohol component and carboxylic acid component to polycondensation reaction in an inert gas atmosphere at a temperature of not lower than 180° C. and not higher than 250° C., if required, in the presence of an esterification catalyst.

From the viewpoint of well controlling a particle size of the resulting polyester PA when using the polyester PA in the form of resin particles, it is preferred that the polyester PA has a sharp molecular weight distribution, and the polycondensation for production of the polyester PA is carried out in the presence of the esterification catalyst.

Examples of the esterification catalyst include tin catalysts, titanium catalysts and metal compounds such as antimony trioxide, zinc acetate and germanium dioxide. Among these esterification catalysts, from the viewpoint of improving reaction efficiency of the esterification reaction upon synthesis of the polyester, preferred are tin catalysts. Specific examples of the preferred tin catalysts include dibutyl tin oxide, tin (II) di(2-ethyl hexanoate) and salts of these compounds. Of these tin catalysts, tin (II) di(2-ethyl hexanoate) is more preferably used.

Also, if required, an esterification co-catalyst such as 3,4,5-trihydroxybenzoic acid (identical to "gallic acid") may be further used in the polycondensation reaction.

In addition, a radical polymerization inhibitor such as 4-tert-butyl catechol and hydroquinone may also be used in combination with the esterification catalyst or co-catalyst.

From the viewpoint of improving substrate-adhesion properties and ejection properties of the resulting ink, the softening point of the polyester PA is preferably not lower than 80° C., more preferably not lower than 85° C. and even more preferably not lower than 90° C., and is also preferably not higher than 170° C., more preferably not higher than 145° C. and even more preferably not higher than 125° C.

From the viewpoint of improving substrate-adhesion properties and ejection properties of the resulting ink, the glass transition temperature (Tg) of the polyester PA is preferably not lower than 50° C. and more preferably not lower than 55° C., and is also preferably not higher than 95° C., more preferably not higher than 90° C., even more preferably not higher than 85° C. and further even more preferably not higher than 80° C.

From the viewpoint of well controlling a particle size of the resin particles and improving substrate-adhesion properties and ejection properties of the resulting ink, the acid value of the polyester PA is preferably not less than 5 mgKOH/g, more preferably not less than 15 mgKOH/g and even more preferably not less than 20 mgKOH/g, and is also preferably not more than 40 mgKOH/g, more preferably not more than 37 mgKOH/g and even more preferably not more than 35 mgKOH/g.

In addition, the weight-average molecular weight (Mw) of the polyester PA is preferably not less than 5,000, more preferably not less than 7,500, even more preferably not less than 10,000 and further even more preferably not less than 12,500 from the viewpoint of improving solvent resistance of the printed characters or images obtained by drying the ink, and is also preferably not more than 100,000, more preferably not more than 75,000, even more preferably not more than 50,000 and further even more preferably not more than 30,000 from the viewpoint of improving dispersion stability of an aqueous dispersion of the pigment-containing polyester-based resin particles A.

The softening point, glass transition temperature, acid value and weight-average molecular weight (Mw) of the polyester PA may be respectively measured by the methods described in Examples below, and may also be respectively controlled to desired values by appropriately adjusting kinds and compounding ratios of the monomers used as well as the polycondensation reaction conditions such as the reaction temperature and the reaction time.

(Pigment)

The pigment used in the present invention is not particularly limited, and may be either an organic pigment or an inorganic pigment and may also be used in the form of a mixture thereof.

Examples of the organic pigment include at least one pigment selected from the group consisting of condensed polycyclic-based pigments such as anthraquinone-based pigments, quinacridone-based pigments, indigo-based pigments, dioxazine-based pigments, perylene-based pigments, perinone-based pigments, isoindolinone-based pigments, isoindoline-based pigments, phthalocyanine-based pigments, quinophthalone-based pigments and diketopyrrolopyrrole-based pigments, and azo-based pigments such as disazo-based pigments and condensed azo-based pigments. Of these organic pigments, from the viewpoint of improving color reproducibility of the printed characters or images, preferred is at least one pigment selected from the group consisting of quinacridone-based pigments, azo-based pigments and phthalocyanine-based pigments.

Specific examples of the quinacridone-based pigments include C.I. PR (Pigment Red) 122, PR 192, PR 202, PR 207 and PR 209, and C.I. PV (Pigment Violet) 19, etc. Of these quinacridone pigments, preferred is at least one pigment selected from the group consisting of C.I. PR 122 and C.I. PV 19.

Specific examples of the azo-based pigments include C.I. PY (Pigment Yellow) 74, PY 151, PY 154, PY 155, PY 180 and PY 213, and C.I. PR (Pigment Red) 150, etc. Of these azo pigments, preferred is at least one pigment selected from the group consisting of C.I. PY 74, C.I. PY 154, C.I. PY 155 and C.I. PR 150.

Specific examples of the phthalocyanine-based pigments include C.I. PB (Pigment Blue) 15:1, PB 15:2, PB 15:3, PB 15:4, PB 15:5, PB 15:6 and PB 16; and PG (Pigment Green) 7 and PG 36. Of these phthalocyanine pigments, preferred is at least one pigment selected from the group consisting of C.I. PB 15:3 and C.I. PB 15:4.

The organic pigment may also include a derivative of the organic pigment. The organic pigment derivative may be produced by such a treatment in which a functional group such as a hydroxy group, a carboxy group, a carbamoyl group, a sulfo group, a sulfonamide group and a phthalimidomethyl group is bonded to the surface of the organic pigment.

Examples of the inorganic pigment include carbon blacks and metal oxides such as alumina and titanium dioxide. These inorganic pigments may be treated with a conventionally known hydrophobization agent such as a titanium coupling agent, a silane coupling agent and a higher fatty acid metal salt.

The carbon blacks are preferably used for black inks. The carbon blacks may include furnace blacks, thermal lamp blacks, acetylene blacks and channel blacks, and may also be in the form of surface-treated carbon blacks.

In addition, the content of the pigment in the water-based ink is preferably not less than 1% by mass, more preferably not less than 2% by mass and even more preferably not less than 3% by mass, and is also preferably not more than 25% by mass, more preferably not more than 10% by mass and even more preferably not more than 7% by mass, from the viewpoint of enhancing optical density of the resulting water-based ink upon printing.

Furthermore, the mass ratio of the pigment to the polyester PA [pigment/polyester PA] is preferably not less than 50/50, more preferably not less than 55/45 and even more preferably not less than 60/40, and is also preferably not more than 90/10, more preferably not more than 85/15 and even more preferably not more than 80/20.

(Production of Pigment-Containing Polyester-Based Resin Particles A)

The pigment-containing polyester-based resin particles A are preferably efficiently produced in the form of an aqueous dispersion thereof by the process including the following steps 1 and 2.

Step 1: subjecting a mixture containing the pigment and the polyester PA as well as the organic solvent and water to dispersion treatment to obtain a dispersion of pigment-containing resin particles (a); and Step 2: removing the organic solvent from the dispersion of the pigment-containing resin particles (a) obtained in the step 1 to obtain an aqueous dispersion of the pigment-containing polyester-based resin particles A.

[Step 1]

The step 1 is the step of subjecting a mixture containing the pigment and the polyester PA as well as the organic solvent and water to dispersion treatment to obtain a dispersion of pigment-containing resin particles (a).

In the step 1, there is preferably used the method in which the polyester PA is first dissolved in the organic solvent to prepare an organic solvent solution of the polyester PA, and then the pigment and water, if required, together with a neutralizing agent, a surfactant and the like, are added to and mixed in the resulting organic solvent solution to obtain a dispersion of an oil-in-water type. The order of addition of the respective components to be added to the organic solvent solution of the polyester PA is not particularly limited, and it is preferred that when using the neutralizing agent in the step 1, the neutralizing agent, water and the pigment are successively added in this order.

Furthermore, when mixing the pigment and the polyester PA in the step 1, the mass ratio of the pigment to the polyester PA [pigment/polyester PA] is preferably not less than 50/50, more preferably not less than 55/45 and even more preferably not less than 60/40, and is also preferably not more than 90/10, more preferably not more than 85/15 and even more preferably not more than 80/20.

The organic solvent used for dissolving the polyester PA is not particularly limited. As the organic solvent, preferred are ketones, ethers, esters and aliphatic alcohols having not less than 1 and not more than 3 carbon atoms, more preferred are ketones, and even more preferred is methyl ethyl ketone. When the polyester PA has been synthesized by the solution polymerization method, the solvent used in the solution polymerization may be used as such in the step 1.

In the case where the polyester PA is in the form of an anionic polymer, an anionic group contained in the polyester PA may be neutralized using a neutralizing agent. Examples of the neutralizing agent include bases such as lithium hydroxide, sodium hydroxide, potassium hydroxide, ammonia and various amines. Among these neutralizing agents, preferred are sodium hydroxide, potassium hydroxide and ammonia. In addition, the polyester PA may be previously neutralized.

The equivalent (mol %) of the neutralizing agent used on the basis of the acid group contained in the polyester PA is preferably not less than 10 mol %, more preferably not less than 20 mol % and even more preferably not less than 30 mol %, and is also preferably not more than 300 mol %, more preferably not more than 200 mol % and even more preferably not more than 150 mol %, from the viewpoint of improving dispersion stability of the polyester PA in the resulting ink and an aqueous medium.

Meanwhile, the equivalent (mol %) of the neutralizing agent used may be calculated according to the following formula. When the equivalent of the neutralizing agent used is not more than 100 mol %, the equivalent of the neutralizing agent used has the same meaning as the degree of neutralization of a resin to be treated. On the other hand, when the equivalent of the neutralizing agent used as calculated according to the following formula exceeds 100 mol %, it is meant that the neutralizing agent is present in an excessive amount relative to the acid group of the resin, and in such a case, the degree of neutralization of the polyester PA is regarded as being 100 mol %.

Equivalent (mol %) of neutralizing agent used= [{mass (g) of neutralizing agent added/equivalent of neutralizing agent}/[{acid value of polyester PA (mgKOH/g)×mass (g) of polyester PA}/(56×1,000)]]×100.

The content of the pigment in the dispersion of the pigment-containing resin particles (a) obtained in the step 1 is preferably not less than 5% by mass and more preferably not less than 10% by mass, and is also preferably not more than 50% by mass and more preferably not more than 40% by mass.

The content of the organic solvent in the dispersion of the pigment-containing resin particles (a) obtained in the step 1 is preferably not less than 10% by mass, and is also preferably not more than 70% by mass and more preferably not more than 50% by mass.

The content of the polyester PA in the dispersion of the pigment-containing resin particles (a) obtained in the step 1 is preferably not less than 2% by mass and more preferably not less than 3% by mass, and is also preferably not more than 40% by mass and more preferably not more than 20% by mass.

The content of water in the dispersion of the pigment-containing resin particles (a) obtained in the step 1 is preferably not less than 10% by mass and more preferably not less than 20% by mass, and is also preferably not more than 70% by mass.

The dispersing method used in the step 1 is not particularly limited. The pigment-containing resin particles (a) may be atomized into fine particles having a desired average particle size only by a substantial dispersion treatment. However, it is preferred that the mixture is first subjected to preliminary dispersion treatment, and then to substantial dispersion treatment by applying a shear stress thereto so as to control the average particle size of the pigment-containing resin particles (a) to a desired value.

The temperature used in the dispersion treatment in the step 1 is preferably not lower than 0° C., and is also preferably not higher than 40° C. and more preferably not higher than 25° C.

The dispersing time in the step 1 is preferably not less than 1 hour and more preferably not less than 2 hours, and is also preferably not more than 30 hours and more preferably not more than 25 hours.

When subjecting the mixture containing the pigment and the polyester PA as well as the organic solvent, the neutralizing agent and water to the preliminary dispersion treatment, there may be used ordinary mixing and stirring devices such as anchor blades and disper blades. Of these devices, preferred are high-speed stirring mixers.

As a means for applying a shear stress to the mixture in the substantial dispersion treatment, there may be used, for example, kneading machines such as roll mills and kneaders, high-pressure homogenizers such as "Microfluidizer" (tradename) available from Microfluidics Corporation, and media-type dispersers such as paint shakers and beads mills. Examples of the commercially available media-type dispersers include "Ultra Apex Mill" (tradename) available from Kotobuki Industries Co., Ltd., and "Pico Mill" (tradename) available from Asada Iron Works Co., Ltd. These devices may be used in combination of any two or more thereof. Among these devices, the high-pressure homogenizers are preferably used from the viewpoint of reducing the particle size of the pigment-containing resin particles (a).

The more preferred dispersing method is such a method in which the mixture is subjected to the preliminary dispersion treatment using a disper or the like, followed by further subjecting the resulting dispersion to the high-pressure dispersion treatment. The term "high-pressure dispersion" as used herein means that the dispersion treatment is conducted under a pressure of not less than 20 MPa.

The pressure used in the aforementioned dispersion treatment is preferably not less than 50 MPa, more preferably not less than 100 MPa and even more preferably not less than 120 MPa, and is also preferably not more than 250 MPa and more preferably not more than 200 MPa, from the viewpoint of reducing the particle size of the pigment-containing resin particles (a) and enhancing dispersion treatment efficiency.

[Step 2]

The step 2 is the step of removing the organic solvent from the dispersion of the pigment-containing resin particles (a) obtained in the step 1 to obtain an aqueous dispersion of the pigment-containing polyester-based resin particles A.

In the step 2, by removing the organic solvent from the dispersion of the pigment-containing resin particles (a) obtained in the step 1 by any conventionally known methods, it is possible to obtain the aqueous dispersion of the pigment-containing polyester-based resin particles A. The organic solvent is preferably substantially completely removed from the thus obtained aqueous dispersion containing the pigment-containing polyester-based resin particles A. However, the residual organic solvent may be present in the aqueous dispersion unless the objects and advantageous effects of the present invention are adversely affected by the residual organic solvent. The content of the residual organic solvent in aqueous dispersion of the pigment-containing polyester-based resin particles A is preferably not more than 0.1% by mass and more preferably not more than 0.01% by mass.

In addition, if required, the dispersion of the pigment-containing resin particles (a) obtained in the step 1 may be subjected to heating and stirring treatments before removing the organic solvent therefrom by distillation.

Examples of the apparatus used for removing the organic solvent include a thin film distillation apparatus such as a batch simple distillation device, a reduced pressure distillation device and a flush evaporator, a rotary distillation device and a stirring evaporator.

The temperature of the dispersion of the pigment-containing resin particles (a) upon removing the organic solvent therefrom may be appropriately selected depending upon the kind of organic solvent used. The temperature of the dispersion of the pigment-containing resin particles (a) upon removing the organic solvent therefrom under reduced pressure is preferably not lower than 20° C., more preferably not lower than 25° C. and even more preferably not lower than 30° C., and is also preferably not higher than 80° C., more preferably not higher than 70° C. and even more preferably not higher than 65° C.

The removal of the organic solvent from the dispersion is preferably conducted such that the concentration of non-volatile components (solid components) in the dispersion obtained after removing the organic solvent therefrom is preferably not less than 18% by mass, more preferably not less than 20% by mass and even more preferably not less than 22% by mass, and is also preferably not more than 60% by mass, more preferably not more than 40% by mass and even more preferably not more than 35% by mass.

In addition, for the purpose of removing coarse particles, etc., from the resulting dispersion, it is preferred that after further subjecting the dispersion obtained by removing the organic solvent therefrom to centrifugal separation, a liquid layer portion thus separated from the dispersion is allowed to pass through a filter, etc., to obtain the aqueous dispersion of the pigment-containing polyester-based resin particles A as an aqueous dispersion having passed through the filter, etc.

In the thus obtained aqueous dispersion of the pigment-containing polyester-based resin particles A, the pigment-containing polyester-based resin particles A as the solid components are dispersed in an aqueous medium containing water as a main medium.

The configuration of the pigment-containing polyester-based resin particles A used in the present invention is not particularly limited, and the pigment-containing polyester-based resin particles A may have any configuration as long as the particles are formed of at least the pigment and the polyester PA. Examples of the configuration of the pigment-containing polyester-based resin particles A include the particle configuration in which at least a part of the pigment is enclosed or encapsulated in the polyester PA, the particle configuration in which the pigment is dispersed in the polyester PA, the particle configuration in which at least a part of the pigment is exposed onto a surface of the respective pigment-containing polyester-based resin particles A, as well as mixtures of these particle configurations. Among these configurations of the pigment-containing polyester-based resin particles A, preferred is the particle configuration in which at least a part of the pigment is enclosed or encapsulated in the polyester PA, in other words, the particle configuration in which at least a part of the pigment is coated with the polyester PA.

[Step 3]

From the viewpoint of suppressing putrefaction of the aqueous dispersion of the pigment-containing polyester-based resin particles A, the step 3 is preferably further conducted after completion of the step 2.

The step 3 is the step of mixing the aqueous dispersion of the pigment-containing polyester-based resin particles A obtained in the step 2 and at least one agent selected from the group consisting of an antiseptic agent, a mildew-proof agent and a sterilizing agent to obtain an aqueous dispersion that contains the at least one agent selected from the group consisting of an antiseptic agent, a mildew-proof agent and a sterilizing agent and the pigment-containing polyester-based resin particles A.

As the mixing method used in the step 3, there may be mentioned, for example, such a method in which the aforementioned aqueous dispersion of the pigment-containing polyester-based resin particles A is mixed with the at least one agent selected from the group consisting of an antiseptic agent, a mildew-proof agent and a sterilizing agent at a temperature of preferably not lower than 60° C. and more preferably not lower than 65° C. while stirring.

<Pigment-Free Polyester-Based Resin Particles B>

The pigment-free polyester-based resin particles B contain a polyester PB.

The average particle size of the pigment-free polyester-based resin particles B is preferably not less than 5 nm and not more than 200 nm. By using such particles, it is possible to obtain a water-based ink that is excellent in substrate-adhesion properties and ejection properties. The average particle size of the pigment-free polyester-based resin particles B is more preferably not less than 10 nm, even more preferably not less than 50 nm and further even more preferably not less than 80 nm from the viewpoint of improving ejection properties of the resulting ink, and is also more preferably not more than 150 nm, even more preferably not more than 130 nm and further even more preferably not more than 120 nm from the viewpoint of improving substrate-adhesion properties of the resulting ink.

Meanwhile, the average particle size of the pigment-free polyester-based resin particles B may be measured by the method described in Examples below.

(Polyester PB)

The polyester PB contains a molecular chain obtained by subjecting at least an alcohol component and a carboxylic acid component to polycondensation reaction. The specific examples and suitable examples of the alcohol component and carboxylic acid component as the raw material monomers of the polyester PB are respectively the same as those of the aforementioned alcohol component and carboxylic acid component as the raw material monomers of the polyester PA. The polyester PB and the polyester PA may be the same or different from each other.

From the viewpoint of improving substrate-adhesion properties and ejection properties of the resulting ink, the content of the polyester PB in the resin contained in the pigment-free polyester-based resin particles B is preferably not less than 80% by mass and more preferably not less than 90% by mass, and is also preferably not more than 100% by mass. The content of the polyester PB in the resin contained in the pigment-free polyester-based resin particles B is furthermore preferably 100% by mass.

In addition, from the same viewpoint as described above, the content of the polyester PB in the water-based ink is preferably not less than 1% by mass, more preferably not less than 2% by mass and even more preferably not less than 3% by mass, and is also preferably not more than 20% by mass, more preferably not more than 10% by mass and even more preferably not more than 8% by mass.

[Method for Producing Polyester PB]

The polyester PB may also be produced by the same method as described above for production of the polyester PA.

In the water-based ink of the present invention, the resin constituting the pigment-containing polyester-based resin particles A and the resin constituting the pigment-free polyester-based resin particles B both are formed of a polyester and therefore have an ester structure, so that both the resins exhibit a high compatibility to each other. For this reason, in the drying step after impacting droplets of the ink onto a printing medium, it is possible to obtain uniform printed characters or images. Thus, the resulting water-based ink can be improved in substrate-adhesion properties, rub fastness and solvent resistance.

(Production of Pigment-Free Polyester-Based Resin Particles B)

In addition, the pigment-free polyester-based resin particles B may be produced in the form of an aqueous dispersion thereof. The method of producing the aqueous dispersion of the pigment-free polyester-based resin particles B may be the same as the method of producing the aqueous dispersion of the pigment-containing polyester-based resin particles A. However, it is preferred that the aqueous dispersion of the pigment-free polyester-based resin particles B is efficiently produced by the method of mixing the polyester PB, an organic solvent, a neutralizing agent and water, and then removing the organic solvent from the resulting mixture.

As the organic solvent and neutralizing agent used in the aforementioned method of producing the aqueous dispersion of the pigment-free polyester-based resin particles B, there may be used the same organic solvent and neutralizing agent as used for producing the aqueous dispersion of the pigment-containing polyester-based resin particles A. The preferred examples of the organic solvent and neutralizing agent used in the aforementioned method are also the same as those described above for production of the aqueous dispersion of the pigment-containing polyester-based resin particles A.

In the aforementioned method, the order of mixing of the polyester PB, the organic solvent, the neutralizing agent and water is as follows. That is, it is more preferred that after previously mixing the polyester PB and the organic solvent, preferably after dissolving the polyester PB in the organic solvent, the neutralizing gent is then added to the resulting mixture or solution, and while stirring the obtained reaction solution, water is further added thereto.

When mixing the polyester PB, the organic solvent, the neutralizing agent and water, the method of mixing these components may be the same mixing method as used in the aforementioned method for producing the aqueous dispersion of the pigment-containing polyester-based resin particles A. However, the aforementioned respective components are preferably mixed with each other only by stirring.

From the viewpoint of improving substrate-adhesion properties and ejection properties of the resulting ink, the softening point of the polyester PB is preferably not lower than 90° C., more preferably not lower than 100° C. and even more preferably not lower than 110° C., and is also preferably not higher than 170° C., more preferably not higher than 160° C., even more preferably not higher than 150° C. and further even more preferably not higher than 130° C.

From the viewpoint of improving substrate-adhesion properties and ejection properties of the resulting ink, the glass transition temperature (Tg) of the polyester PB is preferably not lower than 50° C. and more preferably not lower than 55° C., and is also preferably not higher than 95° C., more preferably not higher than 90° C., even more preferably not higher than 85° C. and further even more preferably not higher than 80° C. In addition, from the viewpoint of improving solvent resistance of the resulting ink, the glass transition temperature (Tg) of the polyester PB is preferably not lower than 60° C., more preferably not lower than 65° C. and even more preferably not lower than 70° C.

From the viewpoint of well controlling a particle size of the resin particles and improving rub fastness of the resulting ink, the acid value of the polyester PB is preferably not less than 5 mgKOH/g, more preferably not less than 15 mgKOH/g and even more preferably not less than 20 mgKOH/g, and is also preferably not more than 40 mgKOH/g, more preferably not more than 37 mgKOH/g and even more preferably not more than 35 mgKOH/g.

In addition, the weight-average molecular weight (Mw) of the polyester PB is preferably not less than 5,000, more preferably not less than 7,500, even more preferably not less than 10,000, further even more preferably not less than 12,500 and still further even more preferably not less than 20,000 from the viewpoint of improving solvent resistance and substrate-adhesion properties of the printed characters or images obtained by drying the ink, and is also preferably not more than 150,000, more preferably not more than 100,000, even more preferably not more than 75,000, further even more preferably not more than 50,000 and still further even more preferably not more than 30,000 from the viewpoint of improving storage stability of the resulting ink.

The softening point, glass transition temperature, acid value and weight-average molecular weight (Mw) of the polyester PB may be respectively measured by the methods described in Examples below, and may also be respectively controlled to desired values by appropriately adjusting kinds and compounding ratios of the monomers used as well as the polycondensation reaction conditions such as the reaction temperature and the reaction time.

<Organic Solvent>

The organic solvent used in the water-based ink of the present invention contains an organic solvent C having a boiling point of not higher than 235° C. in an amount of not less than 90% by mass.

By incorporating such an organic solvent into the water-based ink, it is possible to attain such an advantageous effect that the resulting water-based ink is enhanced in moisture retentivity and exhibits stable ejection properties by suppressing clogging of nozzles. As the organic solvent, from the viewpoint of using the organic solvent in the water-based ink, there may be mentioned polar solvents such as ethers, alcohols, esters, lactones, lactams, amines and the like.

The content of the organic solvent in the water-based ink is preferably not less than 30% by mass and more preferably not less than 40% by mass on the basis of a total amount of water and the organic solvent from the viewpoint of improving wettability of the water-based ink to a printing medium, and is also preferably less than 50% by mass and more preferably not more than 45% by mass on the basis of a total amount of water and the organic solvent from the viewpoint of improving storage stability of the water-based ink.

As the organic solvent, the organic solvent C may be used in combination with the other organic solvents. The content of the organic solvent C having a boiling point of not higher than 235° C. in a whole amount of the organic solvent used is preferably not less than 90% by mass, more preferably not less than 95% by mass, even more preferably not less than 99% by mass and further even more preferably 100% by mass. When the content of the organic solvent C having a boiling point of not higher than 235° C. in a whole amount of the organic solvent used is not less than 90% by mass, the organic solvent tends to hardly remain between the printing medium and the printed characters or images obtained by drying the water-based ink, so that the resulting printed characters or images can be improved in substrate-adhesion properties and solvent resistance.

In addition, the organic solvent is more preferably present in a liquid state at a temperature of 25° C. When using the organic solvent that is present in a liquid state at a temperature of 25° C., the organic solvent is readily removed by evaporation from the water-based ink on the printing medium, so that the resulting printed characters or images hardly become sticky, and can be improved in substrate-adhesion properties and solvent resistance.

The boiling point of the organic solvent C is preferably not lower than 150° C., more preferably not lower than 165° C. and even more preferably not lower than 180° C. from the viewpoint of improving adhesion of the printed characters or images to a non-water absorbing printing medium, and is also preferably not higher than 225° C. from the viewpoint of improving rub fastness, adhesion to a non-water absorbing printing medium and solvent resistance of the resulting water-based ink.

(Organic Solvent C)

From the viewpoint of using the organic solvent in the water-based ink, the organic solvent C may include polar solvents such as ethers, alcohols, esters, lactones, lactams, amines and the like, and preferably ethers and alcohols as compounds having a boiling point of not higher than 235° C. Among these compounds, the preferred organic solvent C is at last one compound selected from the group consisting of diols having a boiling point of not higher than 235° C. and glycol ethers having a boiling point of not higher than 235° C.

As the diols, from the viewpoint of improving rub fastness, substrate-adhesion properties and solvent resistance of the resulting water-based ink, preferred are aliphatic diols having not less than 2 and not more than 6 carbon atoms which contain a hydroxy group that is bonded to the secondary carbon atom, more preferred are aliphatic diols having not less than 3 and not more than 5 carbon atoms which contain a hydroxy group that is bonded to the secondary carbon atom, and even more preferred are aliphatic diols having 3 or 4 carbon atoms and containing a hydroxy group that is bonded to the secondary carbon atom. Among these aliphatic diols, furthermore preferred is at least one compound selected from the group consisting of 1,2-propanediol (boiling point (b.p.): 187° C.), 1,2-butanediol (b.p. 190° C.) and 1,3-butanediol (b.p. 207° C.).

Examples of the glycol ethers include ethylene glycol monoethyl ether (b.p. 135° C.), ethylene glycol monobutyl ether (b.p. 171° C.), diethylene glycol monomethyl ether (b.p. 194° C.), diethylene glycol monopropyl ether, diethylene glycol monoisopropyl ether (b.p. 207° C.), diethylene glycol monobutyl ether (b.p. 230° C.) and diethylene glycol monoisobutyl ether (b.p. 220° C.). Of these glycol ethers, from the viewpoint of improving wettability of the resulting water-based ink to a printing medium as well as from the viewpoint of improving rub fastness, substrate-adhesion properties and solvent resistance of the printed characters or images obtained by drying the water-based ink, preferred is at last one compound selected from the group consisting of diethylene glycol monobutyl ether and diethylene glycol monoisobutyl ether, more preferred is diethylene glycol monoisobutyl ether.

In addition, as the other solvent C, there may be mentioned γ-butyrolactone, etc.

<Water>

As the water contained in the water-based ink of the present invention, preferred are pure water and ultrapure water, such as ion-exchanged water and distilled water.

The content of water in the water-based ink is preferably not less than 45% by mass and more preferably not less than 47% by mass, and is also preferably not more than 75% by mass and more preferably not more than 65% by mass, from the viewpoint of reducing an amount of the organic solvent used and improving ejection properties of the resulting water-based ink.

<Surfactant D>

In the water-based ink of the present invention, from the viewpoint of improving ejection stability of the resulting water-based ink, it is preferred that a surfactant D is incorporated thereinto as a surface tension modifier. Examples of the surfactant D include a nonionic surfactant, an anionic surfactant and a cationic surfactant, etc. Among these surfactants, preferred is a nonionic surfactant. As the surfactant D, there may be used, for example, those surfactants that may be usually used in the water-based ink. Examples of the surfactant D include commercially available surfactants.

The nonionic surfactant used in the present invention may be any nonionic surfactant that can be suitably used in the water-based ink. Examples of the nonionic surfactant include a polyoxyalkylene alkyl ether-type surfactant, an acetylene glycol-based surfactant, a polyhydric alcohol-type surfactant, a fatty acid alkanol amide, a silicone-based surfactant and a fluorine-based surfactant. Among these nonionic surfactants, preferred is at least one surfactant selected from the group consisting of a polyoxyalkylene alkyl ether-type surfactant, an acetylene glycol-based surfactant and a silicone-based surfactant; more preferred is at least one surfactant selected from the group consisting of a surfactant in the form of an alkyleneoxide adduct of an alcohol having not less than 8 and not more than 30 carbon atoms, an acetylene glycol-based surfactant and a silicone-based surfactant; and even more preferred is a silicone-based surfactant.

From the viewpoint of improving ejection stability of the resulting water-based ink as well as from the viewpoint of improving rub fastness, substrate-adhesion properties and solvent resistance of the printed characters or images obtained by drying the water-based ink, further even more preferred is a combination of the surfactant in the form of an alkyleneoxide adduct of an alcohol having not less than 8 and not more than 30 carbon atoms and the acetylene glycol-based surfactant.

The number of carbon atoms of the alcohol having not less than 8 and not more than 30 carbon atoms is preferably not less than 10 and more preferably not less than 12, and is also preferably not more than 24, more preferably not more than 22 and even more preferably not more than 20.

From the same viewpoint as described above, as the alkyleneoxide adduct of the alcohol, preferred are an ethyleneoxide adduct of the alcohol and an ethyleneoxide/propyleneoxide adduct of the alcohol, and more preferred is an ethyleneoxide adduct of the alcohol, i.e., a polyoxyethylene alkyl ether.

In addition, the silicone-based surfactant is preferably a polyether-modified silicone surfactant, more preferably an alkylene glycol-modified polydimethylsiloxane, and even more preferably an alkylene glycol-modified polydimethylsiloxane containing at least one alkylene group selected from the group consisting of an ethylene group and a propylene group. Meanwhile, the molar number of addition of the alkylene group in the alkylene glycol is preferably not less than 5, more preferably not less than 8 and even more preferably not less than 10, and is also preferably not more than 40, more preferably not more than 30 and even more preferably not more than 20.

The content of the surfactant D in the water-based ink is preferably not less than 0.05% by mass, more preferably not less than 0.30% by mass and even more preferably not less than 0.50% by mass, and is also preferably not more than 5.00% by mass, more preferably not more than 1.50% by mass and even more preferably not more than 1.00% by mass.

The water-based ink of the present invention may also contain, in addition to the aforementioned respective components, any optional components such as a pH controller such as amines, a chelating agent such as ethylenediamine tetraacetic acid, a rust preventive and an antioxidant, etc., if required.

<Process for Producing Water-Based Ink>

The water-based ink of the present invention may be produced by mixing at least the aforementioned pigment-containing polyester-based resin particles A, the aforementioned pigment-free polyester-based resin particles B, the aforementioned organic solvent and water, in which the aforementioned pigment-containing polyester-based resin particles A and the aforementioned pigment-free polyester-based resin particles B are preferably mixed in the form of an aqueous dispersion of the aforementioned pigment-containing polyester-based resin particles A and an aqueous dispersion of the aforementioned pigment-free polyester-based resin particles B, respectively.

The aqueous dispersion of the aforementioned pigment-containing polyester-based resin particles A and the aqueous dispersion of the aforementioned pigment-free polyester-based resin particles B which both are used in the process for producing the water-based ink of the present invention are more preferably aqueous dispersions obtained via the aforementioned respective steps.

Also, the water-based ink of the present invention may be further mixed with the aforementioned respective optional components, if required, in addition to the aforementioned pigment-containing polyester-based resin particles A, the aforementioned pigment-free polyester-based resin particles B, the aforementioned organic solvent and water.

Furthermore, the process for producing the water-based ink of the present invention may also include the step of subjecting a mixed solution obtained by mixing these components to filtration treatment using a filter, etc., if required.

[Ink-Jet Printing Method]

The ink-jet printing method according to the present invention is not particularly limited as long as the aforementioned water-based ink is used therein, and is preferably carried out by further using the following method, because the advantageous effects of the present invention can be further enhanced.

The ink-jet printing method according to the present invention is such an ink-jet printing method including the step of printing characters or images on a printing medium using the aforementioned water-based ink of the present invention, in which the printing medium has a water absorption of not less than 0 $g/m^2$ and not more than 2.5 $g/m^2$ per unit surface area thereof as measured in a pure water contact time of 100 milliseconds.

The water absorption of the printing medium used in the ink-jet printing method according to the present invention as measured under the condition that a contact time between the printing medium and pure water is 100 milliseconds is not less than 0 $g/m^2$ and not more than 2.5 $g/m^2$ per unit surface area thereof. Examples of the printing medium include at least one film selected from the group consisting of a polyester film such as a polyethylene terephthalate film, a polyvinyl chloride film, a polypropylene film, a polyethylene film and a nylon film, etc. These films may be subjected to surface treatments such as corona treatment, etc., if required. Among these printing media, from the viewpoint of improving substrate-adhesion properties of the printed characters or images obtained by drying the ink, preferred is a polyester film.

Examples of the generally available films include "LUMIRROR (registered trademark) T60" (polyethylene terephthalate; water absorption: 2.3 g/m$^2$) available from Toray Industries Inc., "PVC80B P" (polyvinyl chloride; water absorption: 1.4 g/m$^2$) available from Lintec Corporation, "KINATH KEE 70CA" (polyethylene) available from Lintec Corporation, "YUPO SG90 PATI" (polypropylene) available from Lintec Corporation, and "BONYL RX" (nylon) available from Kohjin Film & Chemicals Co., Ltd.

Meanwhile, the aforementioned water absorption of the printing medium may be measured by the method described in Examples below.

The ink-jet printing apparatus suitably used in the ink-jet printing method of the present invention may be of either a thermal type or a piezoelectric type. In the ink-jet printing method of the present invention, a piezoelectric type ink-jet printing apparatus is preferably used for printing characters or images on a printing medium using the aforementioned water-based ink. In the piezoelectric ink-jet printing method, the water-based ink hardly suffers from heating or evaporation upon printing, so that it is possible to print characters or images without any damage to the aforementioned properties of the water-based ink.

In the ink-jet printing method of the present invention, after heating the printing medium, characters or images can be printed on the printing medium by an ink-jet printing system using the aforementioned water-based ink. The heating temperature of the printing medium is preferably not lower than 40° C. and more preferably not lower than 50° C. from the viewpoint of improving substrate-adhesion properties of the printed characters or images, and is also preferably not higher than 100° C., more preferably not higher than 80° C. and even more preferably not higher than 60° C. from the viewpoint of suppressing deterioration of the printing medium and saving energy consumed.

In addition, from the viewpoint of promoting drying of the ink after printing characters or images on a printing medium, the printing medium may be heated after forming the printed characters or images thereon. The heating temperature of the printing medium thus printed is preferably not lower than 40° C. and more preferably not lower than 50° C. from the viewpoint of improving substrate-adhesion properties of the printed characters or images, and is also preferably not higher than 100° C., more preferably not higher than 80° C. and even more preferably not higher than 60° C. from the viewpoint of suppressing deterioration of the printing medium and saving energy consumed.

The heating time of the printing medium printed is preferably not less than 10 seconds, more preferably not less than 60 seconds and even more preferably not less than 120 seconds from the viewpoint of promoting drying of the ink on the printing medium, and is also preferably not more than 300 seconds and more preferably not more than 200 seconds from the viewpoint of suppressing deterioration of the printing medium and saving energy consumed.

With respect to the aforementioned embodiments, the present invention further provides the following aspects <1> to <36> relating to the water-based ink, the process for producing the water-based ink, the ink-jet printing method, and the use of the water-based ink.

<1> A water-based ink containing pigment-containing polyester-based resin particles A, pigment-free polyester-based resin particles B, an organic solvent and water, in which a content of an organic solvent C having a boiling point of not higher than 235° C. in a whole amount of the organic solvent is not less than 90% by mass.

<2> The water-based ink according to the aspect <1>, wherein the pigment-containing polyester-based resin particles A contain a polyester PA that is obtained by subjecting at least an alcohol component and a carboxylic acid component to polycondensation.

<3> The water-based ink according to the aspect <2>, wherein the alcohol component contains an aromatic diol, and the aromatic diol is an alkyleneoxide adduct of bisphenol A.

<4> The water-based ink according to the aspect <3>, wherein the alkyleneoxide adduct of bisphenol A is a compound represented by the following general formula (I):

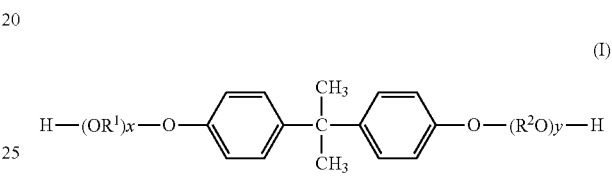

wherein OR$^1$ and R$^2$O are respectively an oxyalkylene group, and are preferably each independently an oxyalkylene group having not less than 1 and not more than 4 carbon atoms and more preferably an oxyethylene group or an oxypropylene group;

x and y each correspond to a molar number of addition of the alkyleneoxide, and are each independently preferably not less than 1 and more preferably not less than 2, and are also each independently preferably not more than 16, more preferably not more than 7, even more preferably not more than 5 and further even more preferably not more than 3, in which an average value of a sum of x and y is preferably not less than 2, and the average value of a sum of x and y is also preferably not more than 7, more preferably not more than 5 and even more preferably not more than 3; and the OR$^1$ groups in the number of x and the R$^2$O groups in the number of y may be respectively the same or different from each other, and the OR$^1$ groups and the R$^2$O groups are respectively preferably identical to each other.

<5> The water-based ink according to any one of the aspects <2> to <4>, wherein a content of the alkyleneoxide adduct of bisphenol A in the alcohol component is preferably not less than 50 mol %, more preferably not less than 60 mol % and even more preferably not less than 70 mol %, and is also preferably not more than 100 mol %.

<6> The water-based ink according to any one of the aspects <2> to <5>, wherein the carboxylic acid component is preferably at least one compound selected from the group consisting of an unsaturated aliphatic dicarboxylic acid and a saturated aliphatic dicarboxylic acid, and more preferably an unsaturated aliphatic dicarboxylic acid.

<7> The water-based ink according to any one of the aspects <2> to <6>, wherein a content of the polyester PA in a resin contained in the pigment-containing polyester-based resin particles A is preferably not less than 80% by mass and more preferably not less than 90% by mass, and is also preferably not more than 100% by mass, and is furthermore preferably 100% by mass.

<8> The water-based ink according to any one of the aspects <2> to <7>, wherein a content of the polyester PA in the water-based ink is preferably not less than 1% by mass and more preferably not less than 2% by mass, and is also preferably not more than 20% by mass, more preferably not more than 10% by mass and even more preferably not more than 5% by mass.

<9> The water-based ink according to any one of the aspects <1> to <8>, wherein a content of the pigment in the water-based ink is preferably not less than 1% by mass, more preferably not less than 2% by mass and even more preferably not less than 3% by mass, and is also preferably not more than 25% by mass, more preferably not more than 10% by mass and even more preferably not more than 7% by mass.

<10> The water-based ink according to any one of the aspects <2> to <9>, wherein a mass ratio of the pigment to the polyester PA [pigment/polyester PA] is preferably not less than 50/50, more preferably not less than 55/45 and even more preferably not less than 60/40, and is also preferably not more than 90/10, more preferably not more than 85/15 and even more preferably not more than 80/20.

<11> The water-based ink according to any one of the aspects <1> to <10>, wherein the pigment-free polyester-based resin particles B contain a polyester PB that is obtained by subjecting at least an alcohol component and a carboxylic acid component to polycondensation.

<12> The water-based ink according to the aspect <11>, wherein the alcohol component as a raw material monomer from which a constitutional unit of the polyester PB is derived contains an aromatic diol, and the aromatic diol is an alkyleneoxide adduct of bisphenol A.

<13> The water-based ink according to the aspect <12>, wherein the alkyleneoxide adduct of bisphenol A is a compound represented by the following general formula (I):

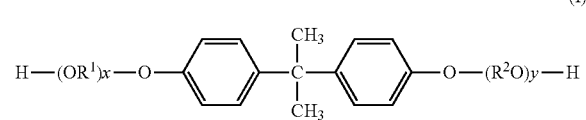

(I)

wherein $OR^1$ and $R^2O$ are respectively an oxyalkylene group, and are preferably each independently an oxyalkylene group having not less than 1 and not more than 4 carbon atoms and more preferably an oxyethylene group or an oxypropylene group;

x and y each correspond to a molar number of addition of the alkyleneoxide, and are each independently preferably not less than 1 and more preferably not less than 2, and are also each independently preferably not more than 16, more preferably not more than 7, even more preferably not more than 5 and further even more preferably not more than 3, in which an average value of a sum of x and y is preferably not less than 2, and the average value of a sum of x and y is also preferably not more than 7, more preferably not more than 5 and even more preferably not more than 3; and the $OR^1$ groups in the number of x and the $R^2O$ groups in the number of y may be respectively the same or different from each other, and the $OR^1$ groups and the $R^2O$ groups are respectively preferably identical to each other.

<14> The water-based ink according to the aspect <12> or <13>, wherein a content of the alkyleneoxide adduct of bisphenol A in the alcohol component is preferably not less than 50 mol %, more preferably not less than 60 mol % and even more preferably not less than 70 mol %, and is also preferably not more than 100 mol %.

<15> The water-based ink according to any one of the aspects <11> to <14>, wherein the alcohol component includes at least one compound selected from the group consisting of ethylene glycol, propylene glycol (identical to "1,2-propanediol"), glycerin, pentaerythritol, trimethylolpropane, hydrogenated bisphenol A, sorbitol and alkylene (having not less than 2 and not more than 4 carbon atoms) oxide adducts of these compounds (average molar number of addition of the alkyleneoxide: not less than 1 and not more than 16).

<16> The water-based ink according to any one of the aspects <11> to <15>, wherein the carboxylic acid component is preferably at least one compound selected from the group consisting of an aromatic dicarboxylic acid, an aliphatic dicarboxylic acid, an alicyclic dicarboxylic acid and a trivalent or higher-valent polycarboxylic acid, more preferably at least one compound selected from the group consisting of an aromatic dicarboxylic acid and an aliphatic dicarboxylic acid, and even more preferably an aliphatic dicarboxylic acid.

<17> The water-based ink according to any one of the aspects <11> to <16>, wherein a content of the polyester PB in a resin contained in the pigment-free polyester-based resin particles B is preferably not less than 80% by mass and more preferably not less than 90% by mass, and is also preferably not more than 100% by mass.

<18> The water-based ink according to any one of the aspects <11> to <17>, wherein a content of the polyester PB in the water-based ink is preferably not less than 1% by mass, more preferably not less than 2% by mass and even more preferably not less than 3% by mass, and is also preferably not more than 20% by mass, more preferably not more than 10% by mass and even more preferably not more than 8% by mass.

<19> The water-based ink according to any one of the aspects <1> to <18>, wherein a content of the organic solvent in the water-based ink is preferably not less than 30% by mass and more preferably not less than 40% by mass, and is also preferably less than 50% by mass and more preferably not more than 45% by mass, on the basis of a total amount of water and the organic solvent.

<20> The water-based ink according to any one of the aspects <1> to <19>, wherein a content of the organic solvent C having a boiling point of not higher than 235° C. in a whole amount of the organic solvent used is preferably not less than 95% by mass, more preferably not less than 99% by mass and even more preferably 100% by mass.

<21> The water-based ink according to any one of the aspects <1> to <20>, wherein the organic solvent is preferably present in a liquid state at a temperature of 25° C.

<22> The water-based ink according to any one of the aspects <1> to <21>, wherein the organic solvent C is preferably at least one compound selected from the group consisting of diols having a boiling point of not higher than 235° C. and glycol ethers having a boiling point of not higher than 235° C.

<23> The water-based ink according to any one of the aspects <1> to <22>, wherein a boiling point of the organic solvent C is preferably not lower than 150° C., more preferably not lower than 165° C. and even more preferably not lower than 180° C., and is also preferably not higher than 225° C.

<24> The water-based ink according to any one of the aspects <1> to <23>, wherein the water is preferably at least one water selected from the group consisting of ion-exchanged water and distilled water.

<25> The water-based ink according to any one of the aspects <1> to <24>, wherein a content of the water in the water-based ink is preferably not less than 45% by mass and more preferably not less than 47% by mass, and is also preferably not more than 75% by mass and more preferably not more than 65% by mass.

<26> The water-based ink according to any one of the aspects <1> to <25>, wherein the water-based ink further contains a surfactant D, and a content of the surfactant D in the water-based ink is preferably not less than 0.05% by mass, more preferably not less than 0.30% by mass and even more preferably not less than 0.50% by mass, and is also preferably not more than 5.00% by mass, more preferably not more than 1.50% by mass and even more preferably not more than 1.00% by mass.

<27> The water-based ink according to the aspect <26>, wherein the surfactant D is preferably a nonionic surfactant, and the nonionic surfactant is preferably at least one surfactant selected from the group consisting of a polyoxyalkylene alkyl ether-type surfactant, an acetylene glycol-based surfactant and a silicone-based surfactant, more preferably at least one surfactant selected from the group consisting of a surfactant in the form of an alkyleneoxide adduct of an alcohol having not less than 8 and not more than 30 carbon atoms, an acetylene glycol-based surfactant and a silicone-based surfactant, and even more preferably a silicone-based surfactant.

<28> The water-based ink according to any one of the aspects <11> to <27>, wherein an acid value of the polyester PB is preferably not less than 5 mgKOH/g, more preferably not less than 15 mgKOH/g and even more preferably not less than 20 mgKOH/g, and is also preferably not more than 40 mgKOH/g, more preferably not more than 37 mgKOH/g and even more preferably not more than 35 mgKOH/g.

<29> The water-based ink according to any one of the aspects <11> to <28>, wherein a weight-average molecular weight (Mw) of the polyester PB is preferably not less than 5,000, more preferably not less than 7,500, even more preferably not less than 10,000, further even more preferably not less than 12,500 and still further even more preferably not less than 20,000, and is also preferably not more than 100,000, more preferably not more than 75,000, even more preferably not more than 50,000 and further even more preferably not more than 30,000.

<30> A process for producing the water-based ink according to any one of the aspects <1> to <29>, including the step of mixing the pigment-containing polyester-based resin particles A, the pigment-free polyester-based resin particles B, the organic solvent and water.

<31> The process for producing the water-based ink, according to the aspect <30>, wherein the pigment-containing polyester-based resin particles A and the pigment-free polyester-based resin particles B are preferably mixed in the form of an aqueous dispersion of the pigment-containing polyester-based resin particles A and an aqueous dispersion of the pigment-free polyester-based resin particles B, respectively, in which the aqueous dispersion of the pigment-containing polyester-based resin particles A is preferably produced by a process including the following steps 1 and 2:

Step 1: subjecting a mixture containing the pigment and the polyester PA as well as the organic solvent and water to dispersion treatment to obtain a dispersion of pigment-containing resin particles (a); and Step 2: removing the organic solvent from the dispersion of the pigment-containing resin particles (a) obtained in the step 1 to obtain the aqueous dispersion of the pigment-containing polyester-based resin particles A.

<32> The process for producing the water-based ink, according to the aspect <30> or <31>, wherein the aqueous dispersion of the pigment-free polyester-based resin particles B is produced by mixing the polyester PB, an organic solvent, a neutralizing agent and water, and then removing the organic solvent from the resulting mixture.

<33> An ink-jet printing method including the step of printing characters or images on a printing medium using the water-based ink according to any one of the aspects <1> to <29>, in which a water absorption of the printing medium per unit surface area thereof is not less than 0 g/m$^2$ and not more than 2.5 g/m$^2$ as measured in a pure water contact time of 100 milliseconds.

<34> The ink-jet printing method according to the aspect <33>, wherein the printing medium is preferably at least one film selected from the group consisting of a polyester film, a polyvinyl chloride film, a polypropylene film, a polyethylene film and a nylon film, and more preferably a polyester film.

<35> A use of the water-based ink according to any one of the aspects <1> to <29> for printing characters or images on a printing medium using an ink-jet printing apparatus, in which a water absorption of the printing medium per unit surface area thereof is not less than 0 g/m$^2$ and not more than 2.5 g/m$^2$ as measured in a pure water contact time of 100 milliseconds.

<36> The use of the water-based ink, according to the aspect <35>, wherein the printing medium is preferably at least one film selected from the group consisting of a polyester film, a polyvinyl chloride film, a polypropylene film, a polyethylene film and a nylon film, and more preferably a polyester film.

EXAMPLES

In the following Production Examples, Preparation Examples, Examples and Comparative Examples, various properties and characteristics were measured and evaluated by the following methods.

[Acid Value of Polyester]

The acid value of the polyester was measured by the same neutralization titration method as prescribed in JIS K 0070-1992 except that a mixed solvent of ethanol and ether used in the method was replaced with a mixed solvent containing acetone and toluene at a volume ratio [acetone:toluene] of 1:1.

[Softening Point of Polyester]

Using a flow tester "CFT-500D" available from Shimadzu Corporation, 1 g of a sample to be measured was extruded through a nozzle having a die pore diameter of 1 mm and a length of 1 mm while heating the sample at a temperature rise rate of 6° C./minute and applying a load of 1.96 MPa thereto by a plunger. The softening point of the sample was determined as the temperature at which a half amount of the sample was flowed out when plotting a downward movement of the plunger of the flow tester relative to the temperature.

[Glass Transition Temperature of Polyester]

Using a differential scanning calorimeter "Pyris 6 DSC" (tradename) commercially available from PerkinElmer Co., Ltd., a sample to be measured was heated to 200° C. and then cooled from 200° C. to 0° C. at a temperature drop rate of 10° C./minute, and thereafter heated again at a temperature rise rate of 10° C./minute to prepare an endothermic characteristic curve thereof. The temperature at which an extension of a baseline below an endothermic maximum peak temperature on the curve was intersected with a tangential line having a maximum inclination of the curve in the range of from a rise-up portion to an apex of the peak was read as a glass transition temperature of the sample.

Meanwhile, in the case where the sample was in the form of resin particles dispersed in an aqueous dispersion of the resin particles, the aqueous dispersion was freeze-dried at −10° C. for 9 hours using a freeze dryer "FDU-2100" available from Tokyo Rika Kikai Co., Ltd., and the thus obtained freeze-dried product was used as the sample.

[Weight-Average Molecular Weight (Mw) of Water-Insoluble Polymer R]

The weight-average molecular weight (Mw) of the sample was measured by gel permeation chromatography using the following measuring apparatus and analytical columns and further using an eluent prepared by dissolving phosphoric acid and lithium bromide in N,N-dimethyl formamide such that concentrations of phosphoric acid and lithium bromide in the resulting solution were 60 mmol/L and 50 mmol/L, respectively. The weight-average molecular weight (Mw) of the sample was calculated on the basis of a calibration curve previously prepared using several kinds of monodisperse polystyrenes "TSKgel Standard Polystyrenes" (tradename; type names: "A-500", "A-2500". "F-1" and "F-10") all available from Tosoh Corporation. The sample was dissolved in N,N-dimethyl formamide to prepare a solution of the sample having a solid content of 0.3% by mass.

<Measuring Conditions>

Measuring apparatus: "HLC-8120GPC" available from Tosoh Corporation

Analytical columns: "TSK-GEL, α-M"×2 available from Tosoh Corporation

Column temperature: 40° C.

Flow rate: 1 mL/min

[Weight-Average Molecular Weights (Mw) of Polyester PA and Polyester PB]

(1) Preparation of Sample Solution

A resin to be measured was dissolved in chloroform to prepare a solution of the resin having a concentration of 0.5 g/100 mL. The resultant solution was then subjected to filtration treatment by passing through a fluororesin filter "FP-200" having a pore size of 2 µm available from Sumitomo Electric Industries, Ltd., to remove insoluble components therefrom, thereby preparing a sample solution.

(2) Measurement of Molecular Weight

Tetrahydrofuran as an eluent was allowed to flow through the analytical columns at a flow rate of 1 mL/minute, and the columns were stabilized in a thermostat at 40° C. One hundred microliters (100 µL) of the sample solution were injected into the columns to measure a molecular weight of the sample. The weight-average molecular weight of the sample was calculated on the basis of a calibration curve previously prepared. The calibration curve of the molecular weight was prepared by using several kinds of monodisperse polystyrenes (monodisperse polystyrenes having weight-average molecular weights (Mw) of $2.63 \times 10^3$, $2.06 \times 10^4$ and $1.02 \times 10^5$ all available from Tosoh Corporation as well as monodisperse polystyrenes having weight-average molecular weights (Mw) of $2.10 \times 10^3$, $7.00 \times 10^3$ and $5.04 \times 10^4$ all available from GL. Sciences Inc., as reference standard samples.

Measuring Apparatus: "CO-8010" available from Tosoh Corporation

Analytical Columns: "GMHXL" and "G3000HXL" both available from Tosoh Corporation

[Solid Contents of Respective Dispersions, Respective Aqueous Dispersions, Respective Concentrates, Solution of Water-Insoluble Polymer R and Dispersion Treatment Product]

Ten grams (10.0 g) of sodium sulfate dried to constant weight in a desiccator were weighed and charged in a 30 mL polypropylene container (inner diameter: 40 mm; height: 30 mm), and 1.0 g of a sample to be measured was added to the container and mixed with the sodium sulfate to prepare a mixture. Thereafter, the resulting mixture was weighed and maintained in the container at 105° C. for 2 hours to remove volatile components therefrom, and further allowed to stand in a desiccator for 15 minutes to measure a mass of the mixture after removing the volatile components therefrom. The value obtained by subtracting the mass of the sodium sulfate from the mass of the mixture after removing the volatile components therefrom was regarded as a mass of solids in the sample obtained after removing the volatile components therefrom. The solid content (% by mass) of the sample was calculated by dividing the mass of the solids by the mass of the sample before removing the volatile components therefrom.

[Average Particle Sizes of Pigment-Containing Polyester-Based Resin Particles A, Pigment-Containing Resin Particles Q, Pigment-Free Polyester-Based Resin Particles B, and Pigment-Free Resin Particles in Aqueous Dispersion Y]

The respective particles were subjected to cumulant analysis using a laser particle analyzing system "ELS-8000" available from Otsuka Electrics Co., Ltd., to measure an average particle size thereof. The measurement was conducted at a temperature of 25° C., an angle between incident light and detector of 90° and a cumulative number of 100 times, and a refractive index of water (1.333) was input to the analyzing system as a refractive index of the dispersing medium. Further, the measurement was conducted by adjusting the concentration of the dispersion to be measured to $5 \times 10^{-3}$% by mass.

[Water Absorption of Printing Medium as Measured in Pure Water Contact Time of 100 Milliseconds]

Using an automatic scanning absorptiometer "KM500win" available from Kumagai Riki Kogyo Co., Ltd., the amount of pure water transferred to a printing medium when contacting the printing medium with pure water for 100 milliseconds was measured at a temperature of 23° C. and a relative humidity of 50%. The thus measured amount of pure water transferred to the printing medium was determined as a water absorption of the printing medium as measured in a pure water contact time of 100 milliseconds. The measuring conditions are as follows.

"Spiral Method"

Contact time (sec): 0.010-1.0

Pitch (mm): 7

Length Per Sampling (degree): 86.29

Start Radius (mm): 20

End Radius (mm): 60

Min Contact Time (ms): 10

Max Cintact Time (ms): 1,000

Sampling Pattern (1-50): 50

Number of Sampling Points (>0): 19

"Square Head"

Slit Span (mm): 1

Slit Width (mm): 5

The details of the pigment, the aqueous dispersion Y of the pigment-free resin particles (for Comparative Example), the organic solvent C, the other organic solvents and the surfactant D used in the following Production Examples, Preparation Examples, Examples and Comparative Examples are as follows.

[Pigment]
Cyan pigment: PB 15:3 (copper phthalocyanine pigment) available from Dainichiseika Color & Chemicals Mfg. Co., Ltd.
Magenta pigment; PR122 (quinacridone-based pigment) available from Dainichiseika Color & Chemicals Mfg. Co., Ltd.
PR150 (azo-based pigment) available from Fuji Pigment Co., Ltd.
Yellow pigment; PY155 (azo-based pigment) available from Clariant Corporation
Black pigment; PB7 (carbon black) available from Cabot Corporation

[Aqueous Dispersion Y of Pigment-Free Resin Particles]
Aqueous dispersion Y: Water-insoluble acrylic resin emulsion "NeoCryl A-1127" (tradename; solid content: 44.0% by mass) available from DSM NeoResins, Inc.; average particle size: 63.0 nm

[Organic Solvent C]
Diethylene glycol monobutyl ether; boiling point: 230° C.
iBDG: Diethylene glycol monoisobutyl ether; boiling point: 220° C.
Propylene glycol; boiling point: 187° C.
1,2-Butanediol; boiling point: 190° C.
1,3-Butanediol; boiling point: 207° C.

[Other Organic Solvents]
Polyethylene glycol 200 (PEG200); boiling point: 250° C.
Glycerin; boiling point: 290° C.; available from Kao Corporation Meanwhile, the organic solvents C other than glycerin as well as the other organic solvent are products available from Wako Pure Chemical Industries, Ltd.

[Surfactant D]
Polyoxyethylene lauryl ether "EMULGEN 120" (tradename; nonionic surfactant) available from Kao Corporation Propylene glycol (50% by mass) solution of an acetylene glycol-based surfactant "SURFYNOL (registered trademark) 104PG50" (tradename; nonionic surfactant) available from Air Products & Chemicals, Inc.
Alkylene glycol-modified polydimethylsiloxane "KF-6011" (tradename; nonionic surfactant) available from Shin-Etsu Chemical Co., Ltd.

Production Examples 1 to 9 (Production of Polyesters PA-1 and PA-2 and Polyesters PB-1 to PA-8)

The respective raw material monomers (alcohol component and carboxylic acid component) as well as the esterification catalyst and the esterification co-catalyst as shown in Table 1 were formulated in amounts shown in Table 1, and the resulting mixture was charged into a 10 L-capacity four-necked flask equipped with a thermometer, a stirrer, a falling type condenser and a nitrogen inlet tube. The contents of the flask were reacted with each other in a mantle heater in a nitrogen atmosphere at 210° C. for 10 hours. Thereafter, the contents of the flask were reacted under a pressure of −8.3 kPa (G) until a softening point of the obtained reaction product reached the temperature shown in Table 1, thereby obtaining the respective polyesters.

The kinds and amounts of the alcohol component and carboxylic acid component compounded as the raw materials as well as properties of the resulting polyesters, etc., are shown in Table 1.

Meanwhile, in the present specification, although "PA-2" and "PB-1" indicate the same polymer, the polymer was expressed by "PA-2" in the case where it was used as the resin in the below-mentioned pigment-containing polyester-based resin particles, whereas the polymer was expressed by "PB-1" in the case where it was used as the resin in the below-mentioned pigment-free polyester-based resin particles.

TABLE 1

|  |  |  | Production Example 1 | | Production Example 2 | | Production Example 3 | |
|---|---|---|---|---|---|---|---|---|
|  |  |  | Polyesters | | | | | |
|  |  |  | PA-1 | | PA-2, PB-1 | | PB-2 | |
|  |  |  | g | mole part(s)*1 | g | mole part(s)*1 | g | mole part(s)*1 |
| Raw material monomers | Alcohol component | BPA-PO*2 | 3718 | 100 | 5740 | 100 | 3255 | 50 |
|  |  | BPA-EO*3 | — | — | — | — | — | — |
|  |  | HBPA*4 | — | — | — | — | 2232 | 50 |
|  |  | 1,2-Propanediol | — | — | — | — | — | — |
|  |  | Ethylene glycol | — | — | — | — | — | — |
|  |  | Trimethylolpropane | — | — | — | — | — | — |
|  | Carboxylic acid component | Terephthalic acid | — | — | 1633 | 60 | 2624 | 85 |
|  |  | Fumaric acid | 1282 | 104 | 571 | 30 | 324 | 15 |
|  |  | Isophthalic acid | — | — | — | — | — | — |
|  |  | Adipic acid | — | — | — | — | — | — |
|  |  | Dodecenylsuccinic anhydride | — | — | — | — | — | — |
|  |  | Trimellitic anhydride | — | — | 378 | 12 | — | — |
| Esterification catalyst | Tin (II) di(2-ethyl hexanoate) [g] |  | 25 | | 40 | | 40 | |
| Esterification co-catalyst | 3,4,5-Tetrahydroxybenzoic acid [g] |  | 0.25 | | — | | — | |
| Properties of polyesters | Softening point [° C.] |  | 100.9 | | 122 | | 141 | |
|  | Glass transition temperature [° C.] |  | 58.5 | | 72 | | 90 | |
|  | Acid value [mgKOH/g] |  | 22.4 | | 31 | | 24 | |
|  | Weight-average molecular weight (Mw) |  | 13700 | | 20700 | | 7500 | |

TABLE 1-continued

|  |  |  | Production Example 4 | | Production Example 5 | | Production Example 6 | |
|---|---|---|---|---|---|---|---|---|
|  |  |  | \multicolumn{6}{c}{Polyesters} | | | | |
|  |  |  | PB-3 | | PB-4 | | PB-5 | |
|  |  |  | g | mole part(s)*1 | g | mole part(s)*1 | g | mole part(s)*1 |
| Raw material monomers | Alcohol component | BPA-PO*2 | — | — | — | — | 3680 | 80 |
|  |  | BPA-EO*3 | — | — | — | — | 808 | 20 |
|  |  | HBPA*4 | 2932 | 47 | — | — | — | — |
|  |  | 1,2-Propanediol | — | — | 761 | 100 | — | — |
|  |  | Ethylene glycol | 596 | 37 | — | — | — | — |
|  |  | Trimethylolpropane | 577 | 16 | — | — | — | — |
|  | Carboxylic acid component | Terephthalic acid | — | — | 1328 | 80 | 1228 | 74 |
|  |  | Fumaric acid | — | — | — | — | — | — |
|  |  | Isophthalic acid | 3970 | 92 | — | — | — | — |
|  |  | Adipic acid | — | — | — | — | — | — |
|  |  | Dodecenylsuccinic anhydride | — | — | — | — | — | — |
|  |  | Trimellitic anhydride | — | — | 77 | 4 | — | 16 |
| Esterification catalyst | Tin (II) di(2-ethyl hexanoate) [g] | | \multicolumn{2}{c}{40} | | \multicolumn{2}{c}{30} | | \multicolumn{2}{c}{15} | |
| Esterification co-catalyst | 3,4,5-Tetrahydroxybenzoic acid [g] | | \multicolumn{2}{c}{—} | | \multicolumn{2}{c}{—} | | \multicolumn{2}{c}{—} | |
| Properties of polyesters | Softening point [° C.] | | \multicolumn{2}{c}{165} | | \multicolumn{2}{c}{140} | | \multicolumn{2}{c}{145} | |
|  | Glass transition temperature [° C.] | | \multicolumn{2}{c}{94} | | \multicolumn{2}{c}{78} | | \multicolumn{2}{c}{76} | |
|  | Acid value [mgKOH/g] | | \multicolumn{2}{c}{8} | | \multicolumn{2}{c}{14.5} | | \multicolumn{2}{c}{17.8} | |
|  | Weight-average molecular weight (Mw) | | \multicolumn{2}{c}{42000} | | \multicolumn{2}{c}{66000} | | \multicolumn{2}{c}{140000} | |

|  |  |  | Production Example 7 | | Production Example 8 | | Production Example 9 | |
|---|---|---|---|---|---|---|---|---|
|  |  |  | \multicolumn{6}{c}{Polyesters} | | | | |
|  |  |  | PB-6 | | PB-7 | | PB-8 | |
|  |  |  | g | mole part(s)*1 | g | mole part(s)*1 | g | mole part(s)*1 |
| Raw material monomers | Alcohol component | BPA-PO*2 | 4600 | 100 | 1394 | 30 | 3220 | 70 |
|  |  | BPA-EO*3 | — | — | 2816 | 70 | 1212 | 30 |
|  |  | HBPA*4 | — | — | — | — | — | — |
|  |  | 1,2-Propanediol | — | — | — | — | — | — |
|  |  | Ethylene glycol | — | — | — | — | — | — |
|  |  | Trimethylolpropane | — | — | — | — | — | — |
|  | Carboxylic acid component | Terephthalic acid | 498 | 30 | 1036 | 62 | 863 | 52 |
|  |  | Fumaric acid | 464 | 40 | — | — | — | — |
|  |  | Isophthalic acid | — | — | — | — | — | — |
|  |  | Adipic acid | 584 | 40 | — | — | — | — |
|  |  | Dodecenylsuccinic anhydride | — | — | 831 | 31 | 1066 | 40 |
|  |  | Trimellitic anhydride | — | — | 230 | 12 | 211 | 11 |
| Esterification catalyst | Tin (II) di(2-ethyl hexanoate) [g] | | \multicolumn{2}{c}{31} | | \multicolumn{2}{c}{32} | | \multicolumn{2}{c}{13} | |
| Esterification co-catalyst | 3,4,5-Tetrahydroxybenzoic acid [g] | | \multicolumn{2}{c}{—} | | \multicolumn{2}{c}{—} | | \multicolumn{2}{c}{—} | |
| Properties of polyesters | Softening point [° C.] | | \multicolumn{2}{c}{111} | | \multicolumn{2}{c}{117} | | \multicolumn{2}{c}{116} | |
|  | Glass transition temperature [° C.] | | \multicolumn{2}{c}{51} | | \multicolumn{2}{c}{61} | | \multicolumn{2}{c}{54} | |
|  | Acid value [mgKOH/g] | | \multicolumn{2}{c}{18.7} | | \multicolumn{2}{c}{18} | | \multicolumn{2}{c}{19} | |
|  | Weight-average molecular weight (Mw) | | \multicolumn{2}{c}{64500} | | \multicolumn{2}{c}{49300} | | \multicolumn{2}{c}{92400} | |

Note
*1Mole part(s) of respective monomers based on 100 mole parts of a whole amount of the alcohol component.
*2Polyoxypropylene (2.2)-2,2-bis(4-hydroxyphenyl)propane
*3Polyoxyethylene (2.2)-2,2-bis(4-hydroxyphenyl)propane
*4Hydrogenated bisphenol A: 2,2-Bis(4-hydroxycyclohexyl)propane Preparation Example 1 (Preparation of Aqueous Dispersion A-I of Pigment-Containing Polyester-Based Resin Particles A-1)

(1) Step 1:

In a 2 L-capacity container, 66.7 g of the polyester PA-1 was dissolved in 156.4 g of methyl ethyl ketone (MEK). The resulting solution was mixed with 5.36 g of a 5N sodium hydroxide aqueous solution as a neutralizing agent and 430 g of ion-exchanged water such that the degree of neutralization of the polyester PA-1 by sodium hydroxide on the basis of the acid value of the polyester PA-1 was adjusted to 85 mol %. The resulting reaction solution was mixed while stirring at a temperature of not lower than 10° C. and not higher than 15° C. using a disper blade at 2,000 r/min for 15 minutes.

Then, 100 g of a cyan pigment was added to the reaction solution, and the resulting mixture was mixed while stirring at a temperature of not lower than 10° C. and not higher than 15° C. using a disper blade at 7,000 r/min for 2 hours.

The resulting preliminary dispersion was subjected to filtration treatment by passing through a 150-mesh filter, and then mixed and diluted with 36.1 g of ion-exchanged water. The thus obtained diluted solution was subjected to dispersion treatment under a pressure of 150 MPa by passing through a Microfluidizer "M-110EH-30XP" available from Microfluidics Corporation; a high-pressure homogenizer: 20 times, thereby obtaining a dispersion of pigment-containing resin particles (a-1).

(2) Step 2:

A 2 L egg-plant shaped flask was charged with a whole amount of the dispersion of the pigment-containing resin particles (a-1) obtained in the step 1, and then ion-exchanged water was added thereto such that a solid content of the dispersion was controlled to 16% by mass. The resulting dispersion was maintained under a pressure of 0.09 MPa (abs) in a warm water bath adjusted at 32° C. for 3 hours using a rotary distillation apparatus "Rotary Evaporator N-1000S" available from Tokyo Rikakikai Co., Ltd., operated at a rotating speed of 50 r/min to thereby remove the organic solvent therefrom. Furthermore, the temperature of the warm water bath was adjusted to 62° C., and the pressure was reduced to 0.07 MPa (abs), and the reaction solution was concentrated under this condition until a solid content of the reaction solution was increased to 25% by mass, thereby obtaining a concentrated solution.

The thus obtained concentrated solution was charged into a 500 mL angle rotor, and subjected to centrifugal separation using a high-speed cooling centrifuge "himac CR22G" (temperature set: 20° C.) available from Hitachi Koki Co., Ltd., at 3,660 r/min for 20 minutes. Thereafter, the resulting liquid layer portion was subjected to filtration treatment by passing through a membrane filter "Minisart" having a pore size of 5 μm available from Sartorius Inc., thereby obtaining an aqueous dispersion of pigment-containing polyester-based resin particles A-1.

(3) Step 3:

After measuring a solid content of the aqueous dispersion of the pigment-containing polyester-based polyester resin particles A-1 obtained in the step 2, ion-exchanged water was added thereto such that a solid content of the resulting solution was controlled to 22% by mass. In addition, 0.76 g of "Ploxel (registered trademark) LV(S)" (antiseptic agent; active ingredient content: 20%) available from LONZA Japan K.K., was added to the obtained dispersion, followed by stirring the resulting mixture at 70° C. for 2 hours. The obtained mixture was cooled to 25° C. and then subjected to filtration treatment by passing through the aforementioned filter having a pore size of 5 μm, and further ion-exchanged water was added to the resulting dispersion such that a solid content of the dispersion was controlled to 22.0% by mass, thereby obtaining an aqueous dispersion A-I of the pigment-containing polyester-based resin particles A-1. The average particle size of the pigment-containing polyester-based resin particles A-1 was 113 nm.

Preparation Example 2 (Preparation of Aqueous Dispersion A-II of Pigment-Containing Polyester-Based Resin Particles A-2)

The same procedure as in Preparation Example 1 was repeated except that the pigment was replaced with a magenta pigment PR122, thereby obtaining an aqueous dispersion A-II of pigment-containing polyester-based resin particles A-2. The average particle size of the pigment-containing polyester-based resin particles A-2 was 139 nm.

Preparation Example 3 (Preparation of Aqueous Dispersion A-III of Pigment-Containing Polyester-Based Resin Particles A-3)

The same procedure as in Preparation Example 1 was repeated except that the pigment was replaced with a yellow pigment, thereby obtaining an aqueous dispersion A-III of pigment-containing polyester-based resin particles A-3. The average particle size of the pigment-containing polyester-based resin particles A-3 was 164 nm.

Preparation Example 4 (Preparation of Aqueous Dispersion A-IV of Pigment-Containing Polyester-Based Resin Particles A-4)

The same procedure as in Preparation Example 1 was repeated except that the pigment was replaced with a black pigment, thereby obtaining an aqueous dispersion A-IV of pigment-containing polyester-based resin particles A-4. The average particle size of the pigment-containing polyester-based resin particles A-4 was 120 nm.

Preparation Example 5 (Preparation of Aqueous Dispersion A-V of Pigment-Containing Polyester-Based Resin Particles A-5)

The same procedure as in Preparation Example 1 was repeated except that the pigment was replaced with a magenta pigment PR150, thereby obtaining an aqueous dispersion A-V of pigment-containing polyester-based resin particles A-5. The average particle size of the pigment-containing polyester-based resin particles A-5 was 161 nm.

Preparation Example 6 (Preparation of Aqueous Dispersion A-VI of Pigment-Containing Polyester-Based Resin Particles A-6)

The same procedure as in Preparation Example 1 was repeated except that the polyester PA-1 was replaced with the polyester PA-2, thereby obtaining an aqueous dispersion A-VI of pigment-containing polyester-based resin particles A-6. The average particle size of the pigment-containing polyester-based resin particles A-6 was 98 nm.

Preparation Example 7 (Preparation of Aqueous Dispersion A-VII of Pigment-Containing Polyester-Based Resin Particles A-7)

The same procedure as in Preparation Example 2 was repeated except that the polyester PA-1 was replaced with the polyester PA-2, thereby obtaining an aqueous dispersion A-VII of pigment-containing polyester-based resin particles A-7. The average particle size of the pigment-containing polyester-based resin particles A-7 was 128 nm.

Preparation Example 8 (Preparation of Aqueous Dispersion A-VIII of Pigment-Containing Polyester-Based Resin Particles A-8)

The same procedure as in Preparation Example 3 was repeated except that the polyester PA-1 was replaced with the polyester PA-2, thereby obtaining an aqueous dispersion A-VIII of pigment-containing polyester-based resin particles A-8. The average particle size of the pigment-containing polyester-based resin particles A-8 was 155 nm.

Preparation Example 9 (Preparation of Aqueous Dispersion A-IX of Pigment-Containing Polyester-Based Resin Particles A-9)

The same procedure as in Preparation Example 4 was repeated except that the polyester PA-1 was replaced with the polyester PA-2, thereby obtaining an aqueous dispersion A-IX of pigment-containing polyester-based resin particles A-9. The average particle size of the pigment-containing polyester-based resin particles A-9 was 96 nm.

Preparation Example 10 (Preparation of Aqueous Dispersion A-X of Pigment-Containing Polyester-Based Resin Particles A-10)

The same procedure as in Preparation Example 5 was repeated except that the polyester PA-1 was replaced with the polyester PA-2, thereby obtaining an aqueous dispersion A-X of pigment-containing polyester-based resin particles A-10. The average particle size of the pigment-containing polyester-based resin particles A-10 was 159 nm.

Production Example R (Production of Solution of Water-Insoluble Polymer R)

The respective raw material monomers, the organic solvent (methyl ethyl ketone) and the chain transfer agent (2-mercaptoethanol) as shown in the column "Initially Charged Monomer Solution" in Table 2 were charged into a reaction vessel equipped with two dropping funnels 1 and 2 and mixed with each other, and an inside atmosphere of the reaction vessel was replaced with nitrogen gas, thereby obtaining an "initially charged monomer solution".

On the other hand, the respective raw material monomers, the organic solvent, the polymerization initiator "V-65" (tradename) (2,2'-azobis(2,4-dimethylvaleronitrile) available from Wako Pure Chemical Industries, Ltd., and the aforementioned chain transfer agent as shown in the column "Dropping Monomer Solution 1" in Table 2 were mixed with each other, thereby obtaining a "dropping monomer solution 1". The resulting dropping monomer solution 1 was charged into the dropping funnel 1, and an inside atmosphere of the dropping funnel 1 was replaced with nitrogen gas.

In addition, the respective raw material monomers, the aforementioned organic solvent, the aforementioned polymerization initiator and the aforementioned chain transfer agent as shown in the column "Dropping Monomer Solution 2" in Table 2 were mixed with each other, thereby obtaining a "dropping monomer solution 2". The resulting dropping monomer solution 2 was charged into the dropping funnel 2, and an inside atmosphere of the dropping funnel 2 was replaced with nitrogen gas.

In a nitrogen atmosphere, the "initially charged monomer solution" in the reaction vessel was maintained at 77° C. while stirring, and the "dropping monomer solution 1" in the dropping funnel 1 was gradually added dropwise to the reaction vessel over 3 hours. Next, the "dropping monomer solution 2" in the dropping funnel 2 was gradually added dropwise to the reaction vessel over 2 hours.

After completion of the dropwise addition of the dropping monomer solutions 1 and 2, the resulting mixed solution in the reaction vessel was stirred at 77° C. for 0.5 hour. Then, a polymerization initiator solution prepared by dissolving 0.6 part by mass of the aforementioned polymerization initiator in 27.0 parts by mass of methyl ethyl ketone was added to the mixed solution, and the resulting reaction solution was aged at 77° C. for 1 hour while stirring.

The aforementioned procedure including the preparation and addition of the polymerization initiator solution and the aging of the reaction solution was repeated five more times. Then, after maintaining the reaction solution in the reaction vessel at 80° C. for 1 hour, methyl ethyl ketone was added thereto, thereby obtaining a solution of a water-insoluble polymer R (solid content: 40.8% by mass). The weight-average molecular weight (Mw) of the thus obtained water-insoluble polymer R was 52,700.

TABLE 2

| | | | Initially charged monomer solution [part(s) by mass] | Dropping monomer solution 1 [part(s) by mass] | Dropping monomer solution 2 [part(s) by mass] |
|---|---|---|---|---|---|
| Raw material monomers | Ionic monomer | Methacrylic acid | — | 76.8 | 19.2 |
| | Hydrophobic monomer | Styrene | 26.4 | 211.2 | 26.4 |
| | | Styrene-based macromer *1 | 18.0 | 162.0 | — |
| | Nonionic monomer | "M-40G"*2 | 15.0 | 120.0 | 15.0 |
| Organic solvent | | Methyl ethyl ketone | 10.5 | 115.5 | 84.0 |
| Polymerization initiator | | "V-65"*3 | — | 4.8 | 1.2 |
| Chain transfer agent | | 2-Mercaptoethanol | 0.08 | 0.59 | 0.17 |

Note
*1 "AS-6(S)" (active ingredient content: 50% by mass; number-average molecular weight: 6000) available from Toagosei Co., Ltd.
*2 Methoxy polyethylene glycol monomethacrylate (m = 4) "NK ESTER M-40G" available from Shin-Nakamura Chemical Co., Ltd.
*3 2,2'-Azobis(2,4-dimethylvaleronitrile) available from Wako Pure Chemical Industries, Ltd.

Preparation Example Q (Preparation of Aqueous Dispersion X of Pigment-Containing Resin Particles Q)

(1) Step I:

The solution of the water-insoluble polymer R (solid content: 40.8% by mass) obtained in Production Example R was weighed in an amount of 157.6 g and mixed with 60.7 g of methyl ethyl ketone (MEK), thereby obtaining an MEK solution of the water-insoluble polymer R. The resulting MEK solution of the water-insoluble polymer R was charged into a 2 L-capacity container, and while stirring the solution using a disper blade at 1,400 r/min, 446.9 g of ion-exchanged water, 22.3 g of a 5N sodium hydroxide aqueous solution and 1.7 g of a 25% by mass ammonia aqueous solution were added thereto such that the degree of neutralization of the water-insoluble polymer R by sodium hydroxide on the basis of the acid value of the water-insoluble polymer R was adjusted to 78.8 mol % and the degree of neutralization of the water-insoluble polymer R by ammonia on the basis of the acid value of the water-insoluble polymer R was adjusted to 21.2 mol %. The resulting reaction solution was stirred at 1,400 r/min for 15 minutes while cooling the solution in a water bath at 0° C.

Then, 150 g of a cyan pigment was added to the reaction solution, and the resulting mixture was stirred at 7,000 r/min for 3 hours, followed by further adding 199.8 g of ion-exchanged water thereto. The thus obtained pigment mixture was subjected to dispersion treatment under a pressure of 150 MPa by passing through a Microfluidizer "M-110EH-30XP" available from Microfluidics Corporation 20 times, thereby obtaining a dispersion treatment product (solid content: 21.0% by mass).

(2) Step II:

A 2 L egg-plant shaped flask was charged with 1,000 g of the dispersion treatment product obtained in the step I, and then 400 g of ion-exchanged water was added thereto, and the resulting dispersion (solid content: 15.0% by mass) was maintained under a pressure of 0.09 MPa (abs) in a warm water bath adjusted at 32° C. for 3 hours using a rotary distillation apparatus "Rotary Evaporator N-1000S" available from Tokyo Rikakikai Co., Ltd., operated at a rotating speed of 50 r/min to thereby remove the organic solvent therefrom. Furthermore, the temperature of the warm water bath was adjusted to 62° C., and the pressure was reduced to 0.07 MPa (abs), and the reaction solution was concentrated under this condition until a solid content of the reaction solution was increased to 25.0% by mass.

The thus obtained concentrated solution was charged into a 500 mL angle rotor, and subjected to centrifugal separation using a high-speed cooling centrifuge "himac CR22G" (temperature set: 20° C.) available from Hitachi Koki Co., Ltd., at 7,000 r/min for 20 minutes. Thereafter, the resulting liquid layer portion was subjected to filtration treatment by passing through a membrane filter "Minisart" having a pore size of 5 μm available from Sartorius Inc., thereby obtaining an aqueous dispersion of pigment-containing resin particles (q).

(3) Step III:

Ion-exchanged water in an amount of 54.6 g was added to 400 g of the aqueous dispersion of the pigment-containing resin particles (q) obtained in the step II (cyan pigment: 68.6 g; water-insoluble polymer R: 29.4 g). In addition, 0.89 g of "Ploxel (registered trademark) LV(S)" (antiseptic agent; active ingredient content: 20%) available from LONZA Japan K.K., and 2.82 g of an epoxy crosslinking agent "DENACOL (registered trademark) EX321L" (tradename; trimethylolpropane polyglycidyl ether; epoxy equivalent: 129) available from Nagase ChemteX Corp., were added to the obtained dispersion such that a content of a glycidyl group in the water-insoluble polymer R on the basis of a carboxy group derived from a methacrylic acid in the water-insoluble polymer R was 40 mol % (crosslinking rate: 40 mol %), followed by stirring the resulting mixture at 70° C. for 2 hours. The obtained mixture was cooled to 25° C. and then subjected to filtration treatment by passing through the aforementioned filter having a pore size of 5 μm, and further ion-exchanged water was added to the resulting dispersion such that a solid content of the dispersion was reduced to 22.0% by mass, thereby obtaining an aqueous dispersion X of pigment-containing resin particles Q (crosslinking rate: 40 mol %). The average particle size of the pigment-containing resin particles Q was 93.1 nm.

Preparation Examples 11 to 18 (Production of Aqueous Dispersions B-I to B-VIII of Pigment-Free Polyester-Based Resin Particles B)

A four-necked flask equipped with a nitrogen inlet tube, a reflux condenser, a stirrer and a thermocouple was charged with the polyester PB and methyl ethyl ketone as an organic solvent in the kinds and formulation as shown in Table 3, and the polyester PB was dissolved in methyl ethyl ketone at 25° C.

Next, the resulting solution was mixed with a 5N sodium hydroxide aqueous solution as a neutralizing agent, and the resulting mixture was further mixed with deionized water while stirring, thereby obtaining a dispersion of resin particles (step 1).

While maintaining the resulting dispersion of the resin particles in the four-necked flask at 60° C. under stirring, an inside pressure of the flask was reduced to remove methyl ethyl ketone therefrom by distillation (step 2).

After being cooled to room temperature, the obtained dispersion was mixed with ion-exchanged water such that the solid content of the dispersion was reduced to 40% by mass, and the resulting dispersion was subjected to filtration treatment by passing through a 200-mesh wire screen, thereby obtaining aqueous dispersions B-I to B-VIII containing pigment-free polyester-based resin particles B-1 to B-8, respectively. The properties of the thus obtained respective aqueous dispersions are shown in Table 3.

TABLE 3

| | | Preparation Example 11 | Preparation Example 12 | Preparation Example 13 | Preparation Example 14 | Preparation Example 15 | Preparation Example 16 | Preparation Example 17 | Preparation Example 18 |
|---|---|---|---|---|---|---|---|---|---|
| Aqueous dispersions of pigment-free polyester-based resin particles B | | B-I | B-II | B-III | B-IV | B-V | B-VI | B-VII | B-VIII |
| Pigment-free polyester-based resin particles B | | B-1 | B-2 | B-3 | B-4 | B-5 | B-6 | B-7 | B-8 |
| Polyester PB | Kind | PB-1 | PB-2 | PB-3 | PB-4 | PB-5 | PB-6 | PB-7 | PB-8 |
| | Amount added [g] | 200 | 200 | 200 | 200 | 200 | 200 | 200 | 200 |
| Methyl ethyl ketone [g] | | 200 | 200 | 200 | 200 | 200 | 200 | 200 | 200 |
| 5N sodium hydroxide aqueous solution [g] | | 13.1 | 10.1 | 3.4 | 7.3 | 9.0 | 9.5 | 9.1 | 9.6 |
| Ion-exchanged water [g] | | 457 | 460 | 457 | 453 | 451 | 451 | 451 | 450 |
| Average particle size [nm]*[1] | | 115 | 107 | 86 | 120 | 97 | 96 | 87 | 83 |

Note

*[1]Average particle size of pigment-free polyester-based resin particles B (measured by "ELS-8000")

Examples 1 to 82 and Comparative Examples 1 to
9 (Production of Water-Based Inks 1 to 15 and
Water-Based Inks 16 to 23)

The components in the respective compositions shown in the following Tables 4 to 10 were mixed with each other. The resulting mixed solution was subjected to filtration treatment by passing through a membrane filter "Minisart" having a pore size of 1.2 μm available from Sartorius Inc., thereby obtaining water-based inks 1 to 82 and water-based inks 83 to 91.

The resulting water-based inks were evaluated by the following methods.

[Rub Fastness]

The respective water-based inks obtained in the Examples and Comparative Examples were loaded into an ink jet printer "IPSiO GX 2500" available from Ricoh Company, Ltd., from an ink injection port located on an upper portion of a cyan print head of the printer through a silicone tube.

Using a software "Photoshop (registered trademark)" available from Adobe Systems Inc., solid image printing was conducted on a polyethylene terephthalate (PET) film "LUMIRROR (registered trademark) T60 #75" (water absorption: 2.3 g/m$^2$) available from Toray Industries Inc., under such a condition that an amount of the ink ejected was 14±2 g/m$^2$, to thereby prepare a solid image print pattern (size: 204 mm in width×275 mm in length) thereon. The solid image pattern-printed film was placed on a hot plate heated to 60° C. for 3 minutes and then cooled to 25° C., thereby obtaining a polyethylene terephthalate printed material for evaluation of rub fastness. The printed surface of the resulting printed material was rubbed with a cellulose nonwoven fabric "BEMCOT (registered trademark) M3-II" available from Asahi Kasei Fiber K.K., by 50 reciprocating motions while applying a load of 2 kg thereto.

The damage (flaws) on the printed surface after being rubbed was visually observed to evaluate rub fastness thereof according to the following evaluation ratings. The larger the numerical value of the following evaluation rating, the less the surface flaws on the printed surface and the more excellent the rub fastness. The evaluation results are shown in Tables 4 to 10.

(Evaluation Ratings)

5: Neither flaws on the printed surface nor deterioration of gloss thereof were visually observed.

4: No flaws on the printed surface were visually observed, but deterioration of gloss thereof was visually observed.

3: Some flaws on the printed surface were visually observed, but no exposure of the surface of the underlying film occurred.

2: Delamination of the printed surface and exposure of the surface of the underlying film occurred, and the area of the surface of the underlying film exposed was less than 50% of an area of the printed portion.

1: Delamination of the printed surface and exposure of the surface of the underlying film occurred, and the area of the surface of the underlying film exposed was not less than 50% of an area of the printed portion.

[Solvent (Ethanol) Resistance]

The water-based ink obtained in the respective Examples and Comparative Examples was loaded into an ink jet printer "IPSIO SG 2010L" equipped with a rubber heater available from Ricoh Company, Ltd., and solid image printing was conducted on a polyethylene terephthalate (PET) film "LUMIRROR (registered trademark) T60 #75" (water absorption: 2.3 g/m$^2$) available from Toray Industries Inc., which was previously heated to 60° C., and the resulting printed material with the solid image was placed on a hot plate heated to 60° C. and dried thereon for 3 minutes, thereby obtaining a polyethylene terephthalate printed material for evaluation of solvent resistance.

Ethanol aqueous solutions were prepared such that ethanol concentrations of the respective solutions were increased at the intervals of 5% by mass in the range of from 10 to 100% by mass. The thus prepared ethanol aqueous solutions were respectively impregnated into a Johnson's cotton swab available from Johnson & Johnson K.K., and the aforementioned polyethylene terephthalate printed material for evaluation of solvent resistance was rubbed with the cotton swab by moving the cotton swab over the printed surface thereof by 10 reciprocative motions while applying a load of 5 g to the cotton swab. The rubbing test was conducted to measure the ethanol concentration of the ethanol aqueous solution at which the printed surface suffered from no change during the test, and the solvent resistance of the water-based ink was evaluated according to the following evaluation ratings. The evaluation results are shown in Tables 4 to 10.

(Evaluation Ratings)

5: No change of the printed surface occurred at an ethanol concentration of 100%.

4: Change of the printed surface occurred at an ethanol concentration of not less than 70% and less than 100%.

3: Change of the printed surface occurred at an ethanol concentration of not less than 50% and less than 70%.

2: Change of the printed surface occurred at an ethanol concentration of not less than 30% and less than 50%.

1: Change of the printed surface occurred at an ethanol concentration of less than 30%.

The evaluation rating 4 or 5 shows that the water-based ink had sufficient solvent resistance.

[Substrate-Adhesion Properties]

The polyethylene terephthalate printed material for evaluation of substrate-adhesion properties was obtained by the same method as used above for preparing the polyethylene terephthalate printed material for evaluation of solvent resistance.

The substrate-adhesion properties of the water-based ink were evaluated by a cross-cut adhesion test according to JIS K 5400. More specifically, the printed surface of the polyethylene terephthalate printed material for evaluation of substrate-adhesion properties was cut along 11 cut lines in each of the longitudinal and lateral directions of the printed material by a cutter knife until a cut depth of the cutter knife reached the base material of the printing medium to thereby form 100 crosscuts on the printed surface. Then, a Cellophane tape was strongly attached onto a crosscut-formed portion of the printed surface, and rapidly peeled off at a peel angle of 45° from an edge of the attached tape to compare the condition of the crosscuts with that before the test and thereby evaluate substrate-adhesion properties of the water-based ink according to the following evaluation ratings. The evaluation results are shown in Tables 4 to 10.

(Evaluation Ratings)

5: Not less than 90% of an entire area of the crosscut-formed portion remained without being peeled.

4: Not less than 80% and less than 90% of an entire area of the crosscut-formed portion remained without being peeled.

3: Not less than 50% and less than 80% of an entire area of the crosscut-formed portion remained without being peeled.

2: Less than 50% of an entire area of the crosscut-formed portion remained without being peeled.

The evaluation rating 4 or 5 shows that the water-based ink had sufficient substrate-adhesion properties.

TABLE 4

| | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| | | | \multicolumn{8}{c}{Water-based ink No.} |
| | | | 1 | 2 | 3 | 4 | 5 | 6 | 7 | 8 |
| Formulation of water-based ink*[1] | Pigment-containing polyester-based resin particles A*[2] | Aqueous dispersion A-I | 30.3 | — | — | — | — | 30.3 | 30.3 | 30.3 |
| | | Aqueous dispersion A-II | — | 30.3 | — | — | — | — | — | — |
| | | Aqueous dispersion A-III | — | — | 30.3 | — | — | — | — | — |
| | | Aqueous dispersion A-IV | — | — | — | 30.3 | — | — | — | — |
| | | Aqueous dispersion A-V | — | — | — | — | 30.3 | — | — | — |
| | Pigment-free polyester-based resin particles B*[2] | Aqueous dispersion B-I | 12.5 | 12.5 | 12.5 | 12.5 | 12.5 | — | — | 12.5 |
| | | Aqueous dispersion B-II | — | — | — | — | — | 12.5 | — | — |
| | | Aqueous dispersion B-III | — | — | — | — | — | — | 12.5 | — |
| | Organic solvent C | iBDG*[3] (boiling point (b.p.): 220° C.) | 5.0 | 5.0 | 5.0 | 5.0 | 5.0 | 5.0 | 5.0 | 5.0 |
| | | Propylene glycol (b.p.: 187° C.) | 30.0 | 30.0 | 30.0 | 30.0 | 30.0 | 30.0 | 30.0 | 27.0 |
| | | 1,2-Butanediol (b.p.: 191° C.) | — | — | — | — | — | — | — | — |
| | | 1,3-Butanediol (b.p.: 203° C.) | — | — | — | — | — | — | — | — |
| | Other organic solvents | Diethylene glycol (b.p.: 244° C.) | — | — | — | — | — | — | — | 3.0 |
| Formulation of water-based ink*[1] | Surfactant D | "EMULGEN 120" | — | — | — | — | — | — | — | — |
| | | "SURFYNOL 104PG50" | — | — | — | — | — | — | — | — |
| | | "KF6011" | 0.50 | 0.50 | 0.50 | 0.50 | 0.50 | 0.50 | 0.50 | 0.50 |
| | Others | 1N NaOH | 0.01 | 0.01 | 0.01 | 0.01 | 0.01 | 0.01 | 0.01 | 0.01 |
| | | Ion-exchanged water | 21.7 | 21.7 | 21.7 | 21.7 | 21.7 | 21.7 | 21.7 | 21.7 |
| Content of organic solvent C in whole amount of organic solvent [% by mass] | | | 100 | 100 | 100 | 100 | 100 | 100 | 100 | 91 |
| Properties of water-based ink | Rub fastness | | 5 | 5 | 5 | 5 | 5 | 4 | 3 | 4 |
| | Substrate-adhesion properties | | 5 | 5 | 5 | 5 | 5 | 4 | 5 | 4 |
| | Solvent resistance | Ethanol concentration | 100% | 100% | 100% | 100% | 100% | 100% | 100% | 70% |
| | | Evaluation results | 5 | 5 | 5 | 5 | 5 | 5 | 5 | 4 |

| | | | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| | | | \multicolumn{8}{c}{Water-based ink No.} |
| | | | 9 | 10 | 11 | 12 | 13 | 14 | 15 | 16 |
| Formulation of water-based ink*[1] | Pigment-containing polyester-based resin particles A*[2] | Aqueous dispersion A-I | 30.3 | 30.3 | 30.3 | 30.3 | 30.3 | 41.7 | 30.3 | 30.3 |
| | | Aqueous dispersion A-II | — | — | — | — | — | — | — | — |
| | | Aqueous dispersion A-III | — | — | — | — | — | — | — | — |
| | | Aqueous dispersion A-IV | — | — | — | — | — | — | — | — |
| | | Aqueous dispersion A-V | — | — | — | — | — | — | — | — |
| | Pigment-free polyester-based resin particles B*[2] | Aqueous dispersion B-I | 12.5 | 17.5 | 17.5 | 17.5 | 17.5 | 12.1 | 17.5 | 17.5 |
| | | Aqueous dispersion B-II | — | — | — | — | — | — | — | — |
| | | Aqueous dispersion B-III | — | — | — | — | — | — | — | — |
| | Organic solvent C | iBDG*[3] (boiling point (b.p.): 220° C.) | 5.0 | 5.0 | 5.0 | 2.0 | 2.0 | 2.0 | 10.0 | 5.0 |
| | | Propylene glycol (b.p.: 187° C.) | 30.0 | 25.0 | 25.0 | 33.0 | 32.5 | 35.0 | 20.0 | 20.0 |
| | | 1,2-Butanediol (b.p.: 191° C.) | — | 5.0 | — | — | — | — | — | 10.0 |
| | | 1,3-Butanediol (b.p.: 203° C.) | — | — | 5.0 | — | — | — | — | — |
| | Other organic solvents | Diethylene glycol (b.p.: 244° C.) | — | — | — | — | 0.5 | — | — | — |
| Formulation of water-based ink*[1] | Surfactant D | "EMULGEN 120" | 1.00 | — | — | — | — | — | — | — |
| | | "SURFYNOL 104PG50" | 0.50 | — | — | — | — | — | — | — |
| | | "KF6011" | — | 0.50 | 0.50 | 0.50 | 0.50 | 0.50 | 0.50 | 0.50 |
| | Others | 1N NaOH | 0.01 | 0.01 | 0.01 | 0.01 | 0.01 | 0.01 | 0.01 | 0.01 |
| | | Ion-exchanged water | 20.7 | 16.7 | 16.7 | 16.7 | 16.7 | 8.7 | 21.7 | 16.7 |
| Content of organic solvent C in whole amount of organic solvent [% by mass] | | | 100 | 100 | 100 | 100 | 99 | 100 | 100 | 100 |
| Properties of water-based ink | Rub fastness | | 5 | 5 | 5 | 5 | 4 | 5 | 4 | 4 |
| | Substrate-adhesion properties | | 4 | 4 | 4 | 5 | 5 | 5 | 4 | 4 |
| | Solvent resistance | Ethanol concentration | 80% | 100% | 100% | 100% | 80% | 100% | 80% | 80% |
| | | Evaluation results | 4 | 5 | 5 | 5 | 4 | 5 | 4 | 4 |

Note
*[1]Percent (%) by mass based on a whole amount of water-based ink
*[2]Amount of aqueous dispersion compounded
*[3]Diethylene glycol monoisobutyl ether

TABLE 5

| | | | Ex. 17 | Ex. 18 | Ex. 19 | Ex. 20 |
|---|---|---|---|---|---|---|
| | | | Water-based ink No. | | | |
| | | | 17 | 18 | 19 | 20 |
| Formulation of water-based ink*1 | Pigment-containing polyester-based resin particles A*2 | Aqueous dispersion A-I | 30.3 | 30.3 | 30.3 | 30.3 |
| | | Aqueous dispersion A-II | — | — | — | — |
| | | Aqueous dispersion A-III | — | — | — | — |
| | | Aqueous dispersion A-IV | — | — | — | — |
| | | Aqueous dispersion A-V | — | — | — | — |
| | Pigment-free polyester-based resin particles B*2 | Aqueous dispersion B-IV | 12.5 | — | — | — |
| | | Aqueous dispersion B-V | — | 12.5 | — | — |
| | | Aqueous dispersion B-VI | — | — | 12.5 | — |
| | | Aqueous dispersion B-VII | — | — | — | 12.5 |
| | | Aqueous dispersion B-VIII | — | — | — | — |
| | Organic solvent C | iBDG*3 (boiling point (b.p.): 220° C.) | 5.0 | 5.0 | 5.0 | 5.0 |
| | | Propylene glycol (b.p.: 187° C.) | 30.0 | 30.0 | 30.0 | 30.0 |
| | | 1,2-Butanediol (b.p.: 191° C.) | — | — | — | — |
| | | 1,3-Butanediol (b.p.: 203° C.) | — | — | — | — |
| | Other organic solvents | Diethylene glycol (b.p.: 244° C.) | — | — | — | — |
| Formulation of water-based ink*1 | Surfactant D | "EMULGEN 120" | — | — | — | — |
| | | "SURFYNOL 104PG50" | — | — | — | — |
| | | "KF6011" | 0.50 | 0.50 | 0.50 | 0.50 |
| | Others | 1N NaOH | 0.01 | 0.01 | 0.01 | 0.01 |
| | | Ion-exchanged water | 21.7 | 21.7 | 21.7 | 21.7 |
| Content of organic solvent C in whole amount of organic solvent [% by mass] | | | 100 | 100 | 100 | 100 |
| Properties of water-based ink | Rub fastness | | 4 | 5 | 5 | 4 |
| | Substrate-adhesion properties | | 5 | 5 | 4 | 4 |
| | Solvent resistance | Ethanol concentration | 100% | 100% | 70% | 70% |
| | | Evaluation results | 5 | 5 | 4 | 4 |

| | | | Ex. 21 | Ex. 22 | Ex. 23 | Ex. 24 |
|---|---|---|---|---|---|---|
| | | | Water-based ink No. | | | |
| | | | 21 | 22 | 23 | 24 |
| Formulation of water-based ink*1 | Pigment-containing polyester-based resin particles A*2 | Aqueous dispersion A-I | 30.3 | — | — | — |
| | | Aqueous dispersion A-II | — | 30.3 | 30.3 | 30.3 |
| | | Aqueous dispersion A-III | — | — | — | — |
| | | Aqueous dispersion A-IV | — | — | — | — |
| | | Aqueous dispersion A-V | — | — | — | — |
| | Pigment-free polyester-based resin particles B*2 | Aqueous dispersion B-IV | — | 12.5 | — | — |
| | | Aqueous dispersion B-V | — | — | 12.5 | — |
| | | Aqueous dispersion B-VI | — | — | — | 12.5 |
| | | Aqueous dispersion B-VII | — | — | — | — |
| | | Aqueous dispersion B-VIII | 12.5 | — | — | — |
| | Organic solvent C | iBDG*3 (boiling point (b.p.): 220° C.) | 5.0 | 5.0 | 5.0 | 5.0 |
| | | Propylene glycol (b.p.: 187° C.) | 30.0 | 30.0 | 30.0 | 30.0 |
| | | 1,2-Butanediol (b.p.: 191° C.) | — | — | — | — |
| | | 1,3-Butanediol (b.p.: 203° C.) | — | — | — | — |
| | Other organic solvents | Diethylene glycol (b.p.: 244° C.) | — | — | — | — |
| Formulation of water-based ink*1 | Surfactant D | "EMULGEN 120" | — | — | — | — |
| | | "SURFYNOL 104PG50" | — | — | — | — |
| | | "KF6011" | 0.50 | 0.50 | 0.50 | 0.50 |
| | Others | 1N NaOH | 0.01 | 0.01 | 0.01 | 0.01 |
| | | Ion-exchanged water | 21.7 | 21.7 | 21.7 | 21.7 |
| Content of organic solvent C in whole amount of organic solvent [% by mass] | | | 100 | 100 | 100 | 100 |
| Properties of water-based ink | Rub fastness | | 5 | 4 | 5 | 5 |
| | Substrate-adhesion properties | | 5 | 5 | 5 | 4 |
| | Solvent resistance | Ethanol concentration | 70% | 100% | 100% | 70% |
| | | Evaluation results | 4 | 5 | 5 | 4 |

TABLE 5-continued

|  |  |  | Example No. |  |  |  |  |  |  |
|---|---|---|---|---|---|---|---|---|---|
|  |  |  | Ex. 25 | Ex. 26 | Ex. 27 | Ex. 28 | Ex. 29 | Ex. 30 | Ex. 31 |
|  |  |  | Water-based ink No. | | | | | | |
|  |  |  | 25 | 26 | 27 | 28 | 29 | 30 | 31 |
| Formulation of water-based ink*[1] | Pigment-containing polyester-based resin particles A*[2] | Aqueous dispersion A-I | — | — | — | — | — | — | — |
|  |  | Aqueous dispersion A-II | 30.3 | 30.3 | — | — | — | — | — |
|  |  | Aqueous dispersion A-III | — | — | 30.3 | 30.3 | 30.3 | 30.3 | 30.3 |
|  |  | Aqueous dispersion A-IV | — | — | — | — | — | — | — |
|  |  | Aqueous dispersion A-V | — | — | — | — | — | — | — |
|  | Pigment-free polyester-based resin particles B*[2] | Aqueous dispersion B-IV | — | — | 12.5 | — | — | — | — |
|  |  | Aqueous dispersion B-V | — | — | — | 12.5 | — | — | — |
|  |  | Aqueous dispersion B-VI | — | — | — | — | 12.5 | — | — |
|  |  | Aqueous dispersion B-VII | 12.5 | — | — | — | — | 12.5 | — |
|  |  | Aqueous dispersion B-VIII | — | 12.5 | — | — | — | — | 12.5 |
|  | Organic solvent C | iBDG*[3] (boiling point (b.p.): 220° C.) | 5.0 | 5.0 | 5.0 | 5.0 | 5.0 | 5.0 | 5.0 |
|  |  | Propylene glycol (b.p.: 187° C.) | 30.0 | 30.0 | 30.0 | 30.0 | 30.0 | 30.0 | 30.0 |
|  |  | 1,2-Butanediol (b.p.: 191° C.) | — | — | — | — | — | — | — |
|  |  | 1,3-Butanediol (b.p.: 203° C.) | — | — | — | — | — | — | — |
|  | Other organic solvents | Diethylene glycol (b.p.: 244° C.) | — | — | — | — | — | — | — |
| Formulation of water-based ink*[1] | Surfactant D | "EMULGEN 120" | — | — | — | — | — | — | — |
|  |  | "SURFYNOL 104PG50" | — | — | — | — | — | — | — |
|  |  | "KF6011" | 0.50 | 0.50 | 0.50 | 0.50 | 0.50 | 0.50 | 0.50 |
|  | Others | 1N NaOH | 0.01 | 0.01 | 0.01 | 0.01 | 0.01 | 0.01 | 0.01 |
|  |  | Ion-exchanged water | 21.7 | 21.7 | 21.7 | 21.7 | 21.7 | 21.7 | 21.7 |
| Content of organic solvent C in whole amount of organic solvent [% by mass] | | | 100 | 100 | 100 | 100 | 100 | 100 | 100 |
| Properties of water-based ink | Rub fastness | | 4 | 5 | 4 | 5 | 5 | 4 | 5 |
|  | Substrate-adhesion properties | | 4 | 5 | 5 | 5 | 4 | 4 | 5 |
|  | Solvent resistance | Ethanol concentration | 70% | 70% | 100% | 100% | 70% | 70% | 70% |
|  |  | Evaluation results | 4 | 4 | 5 | 5 | 4 | 4 | 4 |

Note
*[1]Percent (%) by mass based on a whole amount of water-based ink
*[2]Amount of aqueous dispersion compounded
*[3]Diethylene glycol monoisobutyl ether

TABLE 6

|  |  |  | Example No. |  |  |  |  |
|---|---|---|---|---|---|---|---|
|  |  |  | Ex. 32 | Ex. 33 | Ex. 34 | Ex. 35 | Ex. 36 |
|  |  |  | Water-based ink No. | | | | |
|  |  |  | 32 | 33 | 34 | 35 | 36 |
| Formulation of water-based ink*[1] | Pigment-containing polyester-based resin particles A*[2] | Aqueous dispersion A-I | — | — | — | — | — |
|  |  | Aqueous dispersion A-II | — | — | — | — | — |
|  |  | Aqueous dispersion A-III | — | — | — | — | — |
|  |  | Aqueous dispersion A-IV | 30.3 | 30.3 | 30.3 | 30.3 | 30.3 |
|  |  | Aqueous dispersion A-V | — | — | — | — | — |
|  | Pigment-free polyester-based resin particles B*[2] | Aqueous dispersion B-IV | 12.5 | — | — | — | — |
|  |  | Aqueous dispersion B-V | — | 12.5 | — | — | — |
|  |  | Aqueous dispersion B-VI | — | — | 12.5 | — | — |
|  |  | Aqueous dispersion B-VII | — | — | — | 12.5 | — |
|  |  | Aqueous dispersion B-VIII | — | — | — | — | 12.5 |
|  | Organic solvent C | iBDG*[3] (boiling point (b.p.): 220° C.) | 5.0 | 5.0 | 5.0 | 5.0 | 5.0 |
|  |  | Propylene glycol (b.p.: 187° C.) | 30.0 | 30.0 | 30.0 | 30.0 | 30.0 |
|  |  | 1,2-Butanediol (b.p.: 191° C.) | — | — | — | — | — |
|  |  | 1,3-Butanediol (b.p.: 203° C.) | — | — | — | — | — |
|  | Other organic solvents | Diethylene glycol (b.p.: 244° C.) | — | — | — | — | — |
| Formulation of water-based ink*[1] | Surfactant D | "EMULGEN 120" | — | — | — | — | — |
|  |  | "SURFYNOL 104PG50" | — | — | — | — | — |
|  |  | "KF6011" | 0.50 | 0.50 | 0.50 | 0.50 | 0.50 |
|  | Others | 1N NaOH | 0.01 | 0.01 | 0.01 | 0.01 | 0.01 |
|  |  | Ion-exchanged water | 21.7 | 21.7 | 21.7 | 21.7 | 21.7 |
| Content of organic solvent C in whole amount of organic solvent [% by mass] | | | 100 | 100 | 100 | 100 | 100 |
| Properties of water-based ink | Rub fastness | | 4 | 5 | 5 | 4 | 5 |
|  | Substrate-adhesion properties | | 5 | 5 | 4 | 4 | 5 |
|  | Solvent resistance | Ethanol concentration | 100% | 100% | 70% | 70% | 70% |
|  |  | Evaluation results | 5 | 5 | 4 | 4 | 4 |

TABLE 6-continued

|  |  |  | Ex. 37 | Ex. 38 | Ex. 39 | Ex. 40 | Ex. 41 |
|---|---|---|---|---|---|---|---|
|  |  |  | \multicolumn{5}{c}{Water-based ink No.} |
|  |  |  | 37 | 38 | 39 | 40 | 41 |
| Formulation of water-based ink*1 | Pigment-containing polyester-based resin particles A*2 | Aqueous dispersion A-I | — | — | — | — | — |
|  |  | Aqueous dispersion A-II | — | — | — | — | — |
|  |  | Aqueous dispersion A-III | — | — | — | — | — |
|  |  | Aqueous dispersion A-IV | — | — | — | — | — |
|  |  | Aqueous dispersion A-V | 30.3 | 30.3 | 30.3 | 30.3 | 30.3 |
|  | Pigment-free polyester-based resin particles B*2 | Aqueous dispersion B-IV | 12.5 | — | — | — | — |
|  |  | Aqueous dispersion B-V | — | 12.5 | — | — | — |
|  |  | Aqueous dispersion B-VI | — | — | 12.5 | — | — |
|  |  | Aqueous dispersion B-VII | — | — | — | 12.5 | — |
|  |  | Aqueous dispersion B-VIII | — | — | — | — | 12.5 |
|  | Organic solvent C | iBDG*3 (boiling point (b.p.): 220° C.) | 5.0 | 5.0 | 5.0 | 5.0 | 5.0 |
|  |  | Propylene glycol (b.p.: 187° C.) | 30.0 | 30.0 | 30.0 | 30.0 | 30.0 |
|  |  | 1,2-Butanediol (b.p.: 191° C.) | — | — | — | — | — |
|  |  | 1,3-Butanediol (b.p.: 203° C.) | — | — | — | — | — |
|  | Other organic solvents | Diethylene glycol (b.p,: 244° C.) | — | — | — | — | — |
| Formulation of water-based ink*1 | Surfactant D | "EMULGEN 120" | — | — | — | — | — |
|  |  | "SURFYNOL 104PG50" | — | — | — | — | — |
|  |  | "KF6011" | 0.50 | 0.50 | 0.50 | 0.50 | 0.50 |
|  | Others | 1N NaOH | 0.01 | 0.01 | 0.01 | 0.01 | 0.01 |
|  |  | Ion-exchanged water | 21.7 | 21.7 | 21.7 | 21.7 | 21.7 |
| Content of organic solvent C in whole amount of organic solvent [% by mass] |  |  | 100 | 100 | 100 | 100 | 100 |
| Properties of water-based ink | Rub fastness |  | 4 | 5 | 5 | 4 | 5 |
|  | Substrate-adhesion properties |  | 5 | 5 | 4 | 4 | 5 |
|  | Solvent resistance | Ethanol concentration | 100% | 100% | 70% | 70% | 70% |
|  |  | Evaluation results | 5 | 5 | 4 | 4 | 4 |

Note
*1 Percent (%) by mass based on a whole amount of water-based ink
*2 Amount of aqueous dispersion compounded
*3 Diethylene glycol monoisobutyl ether

TABLE 7

|  |  |  | Ex. 42 | Ex. 43 | Ex. 44 | Ex. 45 | Ex. 46 | Ex. 47 | Ex. 48 | Ex. 49 |
|---|---|---|---|---|---|---|---|---|---|---|
|  |  |  | \multicolumn{8}{c}{Water-based ink No.} |
|  |  |  | 42 | 43 | 44 | 45 | 46 | 47 | 48 | 49 |
| Formulation of water-based ink*1 | Pigment-containing polyester-based resin particles A*2 | Aqueous dispersion A-VI | 30.3 | — | — | — | — | 30.3 | 30.3 | 30.3 |
|  |  | Aqueous dispersion A-VII | — | 30.3 | — | — | — | — | — | — |
|  |  | Aqueous dispersion A-VIII | — | — | 30.3 | — | — | — | — | — |
|  |  | Aqueous dispersion A-IX | — | — | — | 30.3 | — | — | — | — |
|  |  | Aqueous dispersion A-X | — | — | — | — | 30.3 | — | — | — |
|  | Pigment-free polyester-based resin particles B*2 | Aqueous dispersion B-I | 12.5 | 12.5 | 12.5 | 12.5 | 12.5 | — | — | 12.5 |
|  |  | Aqueous dispersion B-II | — | — | — | — | — | 12.5 | — | — |
|  |  | Aqueous dispersion B-III | — | — | — | — | — | — | 12.5 | — |
|  | Organic solvent C | iBDG*3 (boiling point (b.p.): 220° C.) | 5.0 | 5.0 | 5.0 | 5.0 | 5.0 | 5.0 | 5.0 | 5.0 |
|  |  | Propylene glycol (b.p.: 187° C.) | 30.0 | 30.0 | 30.0 | 30.0 | 30.0 | 30.0 | 30.0 | 27.0 |
|  |  | 1,2-Butanediol (b.p.: 191° C.) | — | — | — | — | — | — | — | — |
|  |  | 1,3-Butanediol (b.p.: 203° C.) | — | — | — | — | — | — | — | — |
|  | Other organic solvents | Diethylene glycol (b.p.: 244° C.) | — | — | — | — | — | — | — | 3.0 |
| Formulation of water-based ink*1 | Surfactant D | "EMULGEN 120" | — | — | — | — | — | — | — | — |
|  |  | "SURFYNOL 104PG50" | — | — | — | — | — | — | — | — |
|  |  | "KF6011" | 0.50 | 0.50 | 0.50 | 0.50 | 0.50 | 0.50 | 0.50 | 0.50 |
|  | Others | 1N NaOH | 0.01 | 0.01 | 0.01 | 0.01 | 0.01 | 0.01 | 0.01 | 0.01 |
|  |  | Ion-exchanged water | 21.7 | 21.7 | 21.7 | 21.7 | 21.7 | 21.7 | 21.7 | 21.7 |
| Content of organic solvent C in whole amount of organic solvent [% by mass] |  |  | 100 | 100 | 100 | 100 | 100 | 100 | 100 | 91 |
| Properties of water-based ink | Rub fastness |  | 5 | 5 | 5 | 5 | 5 | 4 | 3 | 4 |
|  | Substrate-adhesion properties |  | 5 | 5 | 5 | 5 | 5 | 4 | 5 | 4 |
|  | Solvent resistance | Ethanol concentration | 100% | 100% | 100% | 100% | 100% | 100% | 100% | 70% |
|  |  | Evaluation results | 5 | 5 | 5 | 5 | 5 | 5 | 5 | 4 |

TABLE 7-continued

|  |  |  | Example No. | | | | | | | |
| --- | --- | --- | --- | --- | --- | --- | --- | --- | --- | --- |
|  |  |  | Ex. 50 | Ex. 51 | Ex. 52 | Ex. 53 | Ex. 54 | Ex. 55 | Ex. 56 | Ex. 57 |
|  |  |  | Water-based ink No. | | | | | | | |
|  |  |  | 50 | 51 | 52 | 53 | 54 | 55 | 56 | 57 |
| Formulation of water-based ink*1 | Pigment-containing polyester-based resin particles A*2 | Aqueous dispersion A-VI | 30.3 | 30.3 | 30.3 | 30.3 | 30.3 | 41.7 | 30.3 | 30.3 |
|  |  | Aqueous dispersion A-VII | — | — | — | — | — | — | — | — |
|  |  | Aqueous dispersion A-VIII | — | — | — | — | — | — | — | — |
|  |  | Aqueous dispersion A-IX | — | — | — | — | — | — | — | — |
|  |  | Aqueous dispersion A-X | — | — | — | — | — | — | — | — |
|  | Pigment-free polyester-based resin particles B*2 | Aqueous dispersion B-I | 12.5 | 17.5 | 17.5 | 17.5 | 17.5 | 12.1 | 17.5 | 17.5 |
|  |  | Aqueous dispersion B-II | — | — | — | — | — | — | — | — |
|  |  | Aqueous dispersion B-III | — | — | — | — | — | — | — | — |
|  | Organic solvent C | iBDG*3 (boiling point (b.p.): 220° C.) | 5.0 | 5.0 | 5.0 | 2.0 | 2.0 | 2.0 | 10.0 | 5.0 |
|  |  | Propylene glycol (b.p.: 187° C.) | 30.0 | 25.0 | 25.0 | 33.0 | 32.5 | 35.0 | 20.0 | 20.0 |
|  |  | 1,2-Butanediol (b.p.: 191° C.) | — | 5.0 | — | — | — | — | — | 10.0 |
|  |  | 1,3-Butanediol (b.p.: 203° C.) | — | — | 5.0 | — | — | — | — | — |
|  | Other organic solvents | Diethylene glycol (b.p.: 244° C.) | — | — | — | — | 0.5 | — | — | — |
| Formulation of water-based ink*1 | Surfactant D | "EMULGEN 120" | 1.00 | — | — | — | — | — | — | — |
|  |  | "SURFYNOL 104PG50" | 0.50 | — | — | — | — | — | — | — |
|  |  | "KF6011" | — | 0.50 | 0.50 | 0.50 | 0.50 | 0.50 | 0.50 | 0.50 |
|  | Others | 1N NaOH | 0.01 | 0.01 | 0.01 | 0.01 | 0.01 | 0.01 | 0.01 | 0.01 |
|  |  | Ion-exchanged water | 20.7 | 16.7 | 16.7 | 16.7 | 16.7 | 8.7 | 21.7 | 16.7 |
| Content of organic solvent C in whole amount of organic solvent [% by mass] | | | 100 | 100 | 100 | 100 | 99 | 100 | 100 | 100 |
| Properties of water-based ink | Rub fastness | | 5 | 5 | 5 | 5 | 4 | 5 | 4 | 4 |
|  | Substrate-adhesion properties | | 4 | 4 | 4 | 5 | 5 | 5 | 4 | 4 |
|  | Solvent resistance | Ethanol concentration | 80% | 100% | 100% | 100% | 80% | 100% | 80% | 80% |
|  |  | Evaluation results | 4 | 5 | 5 | 5 | 4 | 5 | 4 | 4 |

Note
*1 Percent (%) by mass based on a whole amount of water-based ink
*2 Amount of aqueous dispersion compounded
*3 Diethylene glycol monoisobutyl ether

TABLE 8

|  |  |  | Example No. | | | |
| --- | --- | --- | --- | --- | --- | --- |
|  |  |  | Ex. 58 | Ex. 59 | Ex. 60 | Ex. 61 |
|  |  |  | Water-based ink No. | | | |
|  |  |  | 58 | 59 | 60 | 61 |
| Formulation of water-based ink*1 | Pigment-containing polyester-based resin particles A*2 | Aqueous dispersion A-VI | 30.3 | 30.3 | 30.3 | 30.3 |
|  |  | Aqueous dispersion A-VII | — | — | — | — |
|  |  | Aqueous dispersion A-VIII | — | — | — | — |
|  |  | Aqueous dispersion A-IX | — | — | — | — |
|  |  | Aqueous dispersion A-X | — | — | — | — |
|  | Pigment-free polyester-based resin particles B*2 | Aqueous dispersion B-IV | 12.5 | — | — | — |
|  |  | Aqueous dispersion B-V | — | 12.5 | — | — |
|  |  | Aqueous dispersion B-VI | — | — | 12.5 | — |
|  |  | Aqueous dispersion B-VII | — | — | — | 12.5 |
|  |  | Aqueous dispersion B-VIII | — | — | — | — |
|  | Organic solvent C | iBDG*3 (boiling point (b.p.): 220° C.) | 5.0 | 5.0 | 5.0 | 5.0 |
|  |  | Propylene glycol (b.p.: 187° C.) | 30.0 | 30.0 | 30.0 | 30.0 |
|  |  | 1,2-Butanediol (b.p.: 191° C.) | — | — | — | — |
|  |  | 1,3-Butanediol (b.p.: 203° C.) | — | — | — | — |
|  | Other organic solvents | Diethylene glycol (b.p.: 244° C.) | — | — | — | — |
| Formulation of water-based ink*1 | Surfactant D | "EMULGEN 120" | — | — | — | — |
|  |  | "SURFYNOL 104PG50" | — | — | — | — |
|  |  | "KF6011" | 0.50 | 0.50 | 0.50 | 0.50 |
|  | Others | 1N NaOH | 0.01 | 0.01 | 0.01 | 0.01 |
|  |  | Ion-exchanged water | 21.7 | 21.7 | 21.7 | 21.7 |
| Content of organic solvent C in whole amount of organic solvent [% by mass] | | | 100 | 100 | 100 | 100 |
| Properties of water-based ink | Rub fastness | | 4 | 5 | 5 | 4 |
|  | Substrate-adhesion properties | | 5 | 5 | 4 | 4 |
|  | Solvent resistance | Ethanol concentration | 100% | 100% | 70% | 70% |
|  |  | Evaluation results | 5 | 5 | 4 | 4 |

TABLE 8-continued

| | | | Ex. 62 | Ex. 63 | Ex. 64 | Ex. 65 |
|---|---|---|---|---|---|---|
| | | | Water-based ink No. | | | |
| | | | 62 | 63 | 64 | 65 |
| Formulation of water-based ink[*1] | Pigment-containing polyester-based resin particles A[*2] | Aqueous dispersion A-VI | 30.3 | — | — | — |
| | | Aqueous dispersion A-VII | — | 30.3 | 30.3 | 30.3 |
| | | Aqueous dispersion A-VIII | — | — | — | — |
| | | Aqueous dispersion A-IX | — | — | — | — |
| | | Aqueous dispersion A-X | — | — | — | — |
| | Pigment-free polyester-based resin particles B[*2] | Aqueous dispersion B-IV | — | 12.5 | — | — |
| | | Aqueous dispersion B-V | — | — | 12.5 | — |
| | | Aqueous dispersion B-VI | — | — | — | 12.5 |
| | | Aqueous dispersion B-VII | — | — | — | — |
| | | Aqueous dispersion B-VIII | 12.5 | — | — | — |
| | Organic solvent C | iBDG[*3] (boiling point (b.p.): 220° C.) | 5.0 | 5.0 | 5.0 | 5.0 |
| | | Propylene glycol (b.p.: 187° C.) | 30.0 | 30.0 | 30.0 | 30.0 |
| | | 1,2-Butanediol (b.p.: 191° C.) | — | — | — | — |
| | | 1,3-Butanediol (b.p.: 203° C.) | — | — | — | — |
| | Other organic solvents | Diethylene glycol (b.p.: 244° C.) | — | — | — | — |
| Formulation of water-based ink[*1] | Surfactant D | "EMULGEN 120" | — | — | — | — |
| | | "SURFYNOL 104PG50" | — | — | — | — |
| | | "KF6011" | 0.50 | 0.50 | 0.50 | 0.50 |
| | Others | 1N NaOH | 0.01 | 0.01 | 0.01 | 0.01 |
| | | Ion-exchanged water | 21.7 | 21.7 | 21.7 | 21.7 |
| Content of organic solvent C in whole amount of organic solvent [% by mass] | | | 100 | 100 | 100 | 100 |
| Properties of water-based ink | Rub fastness | | 5 | 4 | 5 | 5 |
| | Substrate-adhesion properties | | 5 | 5 | 5 | 4 |
| | Solvent resistance | Ethanol concentration | 70% | 100% | 100% | 70% |
| | | Evaluation results | 4 | 5 | 5 | 4 |

| | | | Ex. 66 | Ex. 67 | Ex. 68 | Ex. 69 | Ex. 70 | Ex. 71 | Ex. 72 |
|---|---|---|---|---|---|---|---|---|---|
| | | | Water-based ink No. | | | | | | |
| | | | 66 | 67 | 68 | 69 | 70 | 71 | 72 |
| Formulation of water-based ink[*1] | Pigment-containing polyester-based resin particles A[*2] | Aqueous dispersion A-VI | — | — | — | — | — | — | — |
| | | Aqueous dispersion A-VII | 30.3 | 30.3 | — | — | — | — | — |
| | | Aqueous dispersion A-VIII | — | — | 30.3 | 30.3 | 30.3 | 30.3 | 30.3 |
| | | Aqueous dispersion A-IX | — | — | — | — | — | — | — |
| | | Aqueous dispersion A-X | — | — | — | — | — | — | — |
| | Pigment-free polyester-based resin particles B[*2] | Aqueous dispersion B-IV | — | — | 12.5 | — | — | — | — |
| | | Aqueous dispersion B-V | — | — | — | 12.5 | — | — | — |
| | | Aqueous dispersion B-VI | — | — | — | — | 12.5 | — | — |
| | | Aqueous dispersion B-VII | 12.5 | — | — | — | — | 12.5 | — |
| | | Aqueous dispersion B-VIII | — | 12.5 | — | — | — | — | 12.5 |
| | Organic solvent C | iBDG[*3] (boiling point (b.p.): 220° C.) | 5.0 | 5.0 | 5.0 | 5.0 | 5.0 | 5.0 | 5.0 |
| | | Propylene glycol (b.p.: 187° C.) | 30.0 | 30.0 | 30.0 | 30.0 | 30.0 | 30.0 | 30.0 |
| | | 1,2-Butanediol (b.p.: 191° C.) | — | — | — | — | — | — | — |
| | | 1,3-Butanediol (b.p.: 203° C.) | — | — | — | — | — | — | — |
| | Other organic solvents | Diethylene glycol (b.p.: 244° C.) | — | — | — | — | — | — | — |
| Formulation of water-based ink[*1] | Surfactant D | "EMULGEN 120" | — | — | — | — | — | — | — |
| | | "SURFYNOL 104PG50" | — | — | — | — | — | — | — |
| | | "KF6011" | 0.50 | 0.50 | 0.50 | 0.50 | 0.50 | 0.50 | 0.50 |
| | Others | 1N NaOH | 0.01 | 0.01 | 0.01 | 0.01 | 0.01 | 0.01 | 0.01 |
| | | Ion-exchanged water | 21.7 | 21.7 | 21.7 | 21.7 | 21.7 | 21.7 | 21.7 |
| Content of organic solvent C in whole amount of organic solvent [% by mass] | | | 100 | 100 | 100 | 100 | 100 | 100 | 100 |
| Properties of water-based ink | Rub fastness | | 4 | 5 | 4 | 5 | 5 | 4 | 5 |
| | Substrate-adhesion properties | | 4 | 5 | 5 | 5 | 4 | 4 | 5 |
| | Solvent resistance | Ethanol concentration | 70% | 70% | 100% | 100% | 70% | 70% | 70% |
| | | Evaluation results | 4 | 4 | 5 | 5 | 4 | 4 | 4 |

Note
[*1]Percent (%) by mass based on a whole amount of water-based ink
[*2]Amount of aqueous dispersion compounded
[*3]Diethylene glycol monoisobutyl ether

TABLE 9

|  |  |  | Ex. 73 | Ex. 74 | Ex. 75 | Ex. 76 | Ex. 77 |
|---|---|---|---|---|---|---|---|
|  |  |  | \multicolumn{5}{c}{Water-based ink No.} |
|  |  |  | 73 | 74 | 75 | 76 | 77 |
| Formulation of water-based ink*1 | Pigment-containing polyester-based resin particles A*2 | Aqueous dispersion A-VI | — | — | — | — | — |
|  |  | Aqueous dispersion A-VII | — | — | — | — | — |
|  |  | Aqueous dispersion A-VIII | — | — | — | — | — |
|  |  | Aqueous dispersion A-IX | 30.3 | 30.3 | 30.3 | 30.3 | 30.3 |
|  |  | Aqueous dispersion A-X | — | — | — | — | — |
|  | Pigment-free polyester-based resin particles B*2 | Aqueous dispersion B-IV | 12.5 | — | — | — | — |
|  |  | Aqueous dispersion B-V | — | 12.5 | — | — | — |
|  |  | Aqueous dispersion B-VI | — | — | 12.5 | — | — |
|  |  | Aqueous dispersion B-VII | — | — | — | 12.5 | — |
|  |  | Aqueous dispersion B-VIII | — | — | — | — | 12.5 |
|  | Organic solvent C | iBDG*3 (boiling point (b.p.): 220° C.) | 5.0 | 5.0 | 5.0 | 5.0 | 5.0 |
|  |  | Propylene glycol (b.p.: 187° C.) | 30.0 | 30.0 | 30.0 | 30.0 | 30.0 |
|  |  | 1,2-Butanediol (b.p.: 191° C.) | — | — | — | — | — |
|  |  | 1,3-Butanediol (b.p.: 203° C.) | — | — | — | — | — |
|  | Other organic solvents | Diethylene glycol (b.p.: 244° C.) | — | — | — | — | — |
| Formulation of water-based ink*1 | Surfactant D | "EMULGEN 120" | — | — | — | — | — |
|  |  | "SURFYNOL 104PG50" | — | — | — | — | — |
|  |  | "KF6011" | 0.50 | 0.50 | 0.50 | 0.50 | 0.50 |
|  | Others | 1N NaOH | 0.01 | 0.01 | 0.01 | 0.01 | 0.01 |
|  |  | Ion-exchanged water | 21.7 | 21.7 | 21.7 | 21.7 | 21.7 |
| Content of organic solvent C in whole amount of organic solvent [% by mass] |  |  | 100 | 100 | 100 | 100 | 100 |
| Properties of water-based ink | Rub fastness |  | 4 | 5 | 5 | 4 | 5 |
|  | Substrate-adhesion properties |  | 5 | 5 | 4 | 4 | 5 |
|  | Solvent resistance | Ethanol concentration | 100% | 100% | 70% | 70% | 70% |
|  |  | Evaluation results | 5 | 5 | 4 | 4 | 4 |

|  |  |  | Ex. 78 | Ex. 79 | Ex. 80 | Ex. 81 | Ex. 82 |
|---|---|---|---|---|---|---|---|
|  |  |  | \multicolumn{5}{c}{Water-based ink No.} |
|  |  |  | 78 | 79 | 80 | 81 | 82 |
| Formulation of water-based ink*1 | Pigment-containing polyester-based resin particles A*2 | Aqueous dispersion A-VI | — | — | — | — | — |
|  |  | Aqueous dispersion A-VII | — | — | — | — | — |
|  |  | Aqueous dispersion A-VIII | — | — | — | — | — |
|  |  | Aqueous dispersion A-IX | — | — | — | — | — |
|  |  | Aqueous dispersion A-X | 30.3 | 30.3 | 30.3 | 30.3 | 30.3 |
|  | Pigment-free polyester-based resin particles B*2 | Aqueous dispersion B-IV | 12.5 | — | — | — | — |
|  |  | Aqueous dispersion B-V | — | 12.5 | — | — | — |
|  |  | Aqueous dispersion B-VI | — | — | 12.5 | — | — |
|  |  | Aqueous dispersion B-VII | — | — | — | 12.5 | — |
|  |  | Aqueous dispersion B-VIII | — | — | — | — | 12.5 |
|  | Organic solvent C | iBDG*3 (boiling point (b.p.): 220° C.) | 5.0 | 5.0 | 5.0 | 5.0 | 5.0 |
|  |  | Propylene glycol (b.p.: 187° C.) | 30.0 | 30.0 | 30.0 | 30.0 | 30.0 |
|  |  | 1,2-Butanediol (b.p.: 191° C.) | — | — | — | — | — |
|  |  | 1,3-Butanediol (b.p.: 203° C.) | — | — | — | — | — |
|  | Other organic solvents | Diethylene glycol (b.p.: 244° C.) | — | — | — | — | — |
| Formulation of water-based ink*1 | Surfactant D | "EMULGEN 120" | — | — | — | — | — |
|  |  | "SURFYNOL 104PG50" | — | — | — | — | — |
|  |  | "KF6011" | 0.50 | 0.50 | 0.50 | 0.50 | 0.50 |
|  | Others | 1N NaOH | 0.01 | 0.01 | 0.01 | 0.01 | 0.01 |
|  |  | Ion-exchanged water | 21.7 | 21.7 | 21.7 | 21.7 | 21.7 |
| Content of organic solvent C in whole amount of organic solvent [% by mass] |  |  | 100 | 100 | 100 | 100 | 100 |
| Properties of water-based ink | Rub fastness |  | 4 | 5 | 5 | 4 | 5 |
|  | Substrate-adhesion properties |  | 5 | 5 | 4 | 4 | 5 |
|  | Solvent resistance | Ethanol concentration | 100% | 100% | 70% | 70% | 70% |
|  |  | Evaluation results | 5 | 5 | 4 | 4 | 4 |

Note
*1Percent (%) by mass based on a whole amount of water-based ink
*2Amount of aqueous dispersion compounded
*3Diethylene glycol monoisobutyl ether

TABLE 10

|  |  |  | Comparative Example No. | | | | |
|---|---|---|---|---|---|---|---|
|  |  |  | Com. Ex. 1 | Com. Ex. 2 | Com. Ex. 3 | Com. Ex. 4 | Com. Ex. 5 |
|  |  |  | Water-based ink No. | | | | |
|  |  |  | 83 | 84 | 85 | 86 | 87 |
| Formulation of water-based ink*[1] | Pigment-containing polyester-based resin particles A*[2] | Aqueous dispersion A-I | 30.3 | — | — | — | 30.3 |
|  | Pigment-containing resin particles Q*[2] | Aqueous dispersion X | — | 26.0 | 26.0 | 26.0 | — |
|  | Pigment-free polyester-based resin particles B*[2] | Aqueous dispersion B-I | — | — | 10.0 | 17.5 | 17.5 |
|  | Pigment-free water-insoluble acrylic resin particles*[2] | Aqueous dispersion Y | 9.1 | 9.1 | — | — | — |
|  | Organic solvent C | iBDG*[3] (boiling point (b.p.): 220° C.) | 10.0 | 10.0 | 10.0 | 10.0 | 5.0 |
|  | Other organic solvents | Propylene glycol (b.p.: 187° C.) | 27.0 | 27.0 | 27.0 | 27.0 | 25.0 |
|  |  | Diethylene glycol (b.p.: 244° C.) | — | — | — | — | 5.0 |
|  |  | Glycerin (b.p.: 290° C.) | — | — | — | — | — |
|  |  | PEG200*[4] (b.p.: 250° C.) | — | — | — | — | — |
| Formulation of water-based ink*[1] | Surfactant D | "EMULGEN 120" | — | — | — | — | — |
|  |  | "SURFYNOL 104PG50" | — | — | — | — | — |
|  |  | "KF6011" | 0.50 | 0.50 | 0.50 | 0.50 | 0.50 |
|  | Others | 1N NaOH | 0.01 | 0.01 | 0.01 | 0.01 | 0.01 |
|  |  | Ion-exchanged water | 23.1 | 27.4 | 26.5 | 19.0 | 16.7 |
| Content of organic solvent C in whole amount of organic solvent [% by mass] | | | 100 | 100 | 100 | 100 | 86 |
| Properties of water-based ink | Rub fastness | | 5 | 5 | 5 | 5 | 5 |
|  | Substrate-adhesion properties | | 3 | 5 | 4 | 4 | 3 |
|  | Solvent resistance | Ethanol concentration | 50% | 60% | 50% | 50% | 70% |
|  |  | Evaluation results | 3 | 3 | 3 | 3 | 4 |

|  |  |  | Comparative Example No. | | | |
|---|---|---|---|---|---|---|
|  |  |  | Com. Ex. 6 | Com. Ex. 7 | Com. Ex. 8 | Com. Ex. 9 |
|  |  |  | Water-based ink No. | | | |
|  |  |  | 88 | 89 | 90 | 91 |
| Formulation of water-based ink*[1] | Pigment-containing polyester-based resin particles A*[2] | Aqueous dispersion A-I | 30.3 | 30.3 | 30.3 | 30.3 |
|  | Pigment-containing resin particles Q*[2] | Aqueous dispersion X | — | — | — | — |
|  | Pigment-free polyester-based resin particles B*[2] | Aqueous dispersion B-I | 17.5 | 17.5 | 17.5 | 17.5 |
|  | Pigment-free water-insoluble acrylic resin particles*[2] | Aqueous dispersion Y | — | — | — | — |
|  | Organic solvent C | iBDG*[3] (boiling point (b.p.): 220° C.) | 5.0 | 5.0 | 5.0 | — |
|  | Other organic solvents | Propylene glycol (b.p.: 187° C.) | — | 25.0 | 25.0 | — |
|  |  | Diethylene glycol (b.p.: 244° C.) | 30.0 | — | — | 15.0 |
|  |  | Glycerin (b.p.: 290° C.) | — | 5.0 | — | 8.7 |
|  |  | PEG200*[4] (b.p.: 250° C.) | — | — | 5.0 | — |
| Formulation of water-based ink*[1] | Surfactant D | "EMULGEN 120" | — | — | — | 1.50 |
|  |  | "SURFYNOL 104PG50" | — | — | — | 1.50 |
|  |  | "KF6011" | 0.50 | 0.50 | 0.50 | — |
|  | Others | 1N NaOH | 0.01 | 0.01 | 0.01 | 0.01 |
|  |  | Ion-exchanged water | 16.7 | 16.7 | 16.7 | 25.5 |
| Content of organic solvent C in whole amount of organic solvent [% by mass] | | | 14 | 86 | 86 | 0 |
| Properties of water-based ink | Rub fastness | | 1 | 3 | 3 | 1 |
|  | Substrate-adhesion properties | | 2 | 3 | 3 | 2 |
|  | Solvent resistance | Ethanol concentration | 30% | 30% | 30% | 30% |
|  |  | Evaluation results | 2 | 2 | 2 | 2 |

Note
*[1] Percent (%) by mass based on a whole amount of water-based ink
*[2] Amount of aqueous dispersion compounded
*[3] Diethylene glycol monoisobutyl ether
*[4] Polyethylene glycol 200

As apparently recognized from the evaluation results shown in Tables 4 to 10, the water-based inks 1 to 82 obtained in Examples 1 to 82 according to the present invention were improved in rub fastness, solvent resistance and substrate-adhesion properties of the resulting printed characters or images with good balance therebetween, as compared to those water-based inks 83 to 91 obtained in Comparative Examples 1 to 9.

INDUSTRIAL APPLICABILITY

In accordance with the water-based ink and the ink-jet printing method using the water-based ink according to the present invention, even when printed on a non-water absorbing printing medium, it is possible to improve rub fastness, solvent resistance and substrate-adhesion properties of the printed characters or images with good balance therebetween.

The invention claimed is:
1. A water-based ink comprising
pigment-containing polyester-based resin particles A,
pigment-free polyester-based resin particles B,
an organic solvent and
water,
in which a content of an organic solvent C having a boiling point of not lower than 150° C. and not higher than 235° C. in a whole amount of the organic solvent is not less than 90% by mass.
2. The water-based ink according to claim 1, further comprising a surfactant D in an amount of not more than 5% by mass.
3. The water-based ink according to claim 1, wherein the organic solvent C is at least one compound selected from the group consisting of a diol and a glycol ether.
4. The water-based ink according to claim 1, wherein a resin constituting the pigment-containing polyester-based resin particles A comprises a polyester PA that is obtained by subjecting at least an alcohol component and a carboxylic acid component to polycondensation, in an amount of not less than 80% by mass.
5. The water-based ink according to claim 4, wherein the alcohol component comprises an aromatic diol, and the aromatic diol is an alkyleneoxide adduct of bisphenol A.
6. The water-based ink according to claim 4, wherein the carboxylic acid component is at least one compound selected from the group consisting of an unsaturated aliphatic dicarboxylic acid and a saturated aliphatic dicarboxylic acid.
7. The water-based ink according to claim 1, wherein a resin constituting the pigment-free polyester-based resin particles B comprises a polyester PB that is obtained by subjecting at least an alcohol component and a carboxylic acid component to polycondensation, in an amount of not less than 80% by mass.
8. The water-based ink according to claim 7, wherein the alcohol component comprises an aromatic diol, and the aromatic diol is an alkyleneoxide adduct of bisphenol A.
9. The water-based ink according to claim 7, wherein the carboxylic acid component is at least one compound selected from the group consisting of an aromatic dicarboxylic acid, an aliphatic dicarboxylic acid, an alicyclic dicarboxylic acid and a trivalent or higher-valent polycarboxylic acid.
10. The water-based ink according to claim 1, wherein a content of the water in the water-based ink is not less than 45% by mass.
11. The water-based ink according to claim 1, wherein a content of the organic solvent in the water-based ink is not less than 30% by mass on the basis of a total amount of the water and the organic solvent.
12. An ink-jet printing method comprising the step of printing characters or images on a printing medium using the water-based ink according to claim 1, in which a water absorption of the printing medium per unit surface area thereof is not less than 0 g/m$^2$ and not more than 2.5 g/m$^2$ as measured in a pure water contact time of 100 milliseconds.
13. The ink-jet printing method according to claim 12, wherein the printing medium is at least one film selected from the group consisting of a polyester film, a polyvinyl chloride film, a polypropylene film, a polyethylene film and a nylon film.
14. The water-based ink according to claim 4, wherein a content of the polyester PA in the water-based ink is not less than 1% by mass and not more than 20% by mass.
15. The water-based ink according to claim 1, wherein a content of the pigment in the water-based ink is not less than 1% by mass and not more than 25% by mass.
16. The water-based ink according to claim 4, wherein a mass ratio of the pigment to the polyester PA [pigment/polyester PA] is not less than 50/50 and not more than 90/10.
17. The water-based ink according to claim 7, wherein a content of the polyester PB in the water-based ink is not less than 1% by mass and not more than 20% by mass.
18. The water-based ink according to claim 1, wherein a content of the organic solvent in the water-based ink is not less than 30% by mass and less than 50% by mass, on the basis of a total amount of water and the organic solvent.
19. The water-based ink according to claim 2, wherein the surfactant D is at least one surfactant selected from the group consisting of a polyoxyalkylene alkyl ether-type surfactant, an acetylene glycol-based surfactant and a silicone-based surfactant.

* * * * *